US008678577B2

(12) United States Patent
Arai et al.

(10) Patent No.: US 8,678,577 B2
(45) Date of Patent: Mar. 25, 2014

(54) INK SET AND IMAGE FORMATION METHOD

(75) Inventors: Yoshimitsu Arai, Kanagawa (JP); Tomoyuki Ohzeki, Kanagawa (JP); Mika Imamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 389 days.

(21) Appl. No.: 12/843,049

(22) Filed: Jul. 26, 2010

(65) Prior Publication Data

US 2011/0037805 A1 Feb. 17, 2011

(30) Foreign Application Priority Data

Aug. 17, 2009 (JP) ................................ 2009-188264

(51) Int. Cl.
*B41J 2/01* (2006.01)

(52) U.S. Cl.
USPC ............................................ 347/100; 347/96

(58) Field of Classification Search
USPC ............. 347/100, 95, 96, 101, 21, 20, 9, 105, 347/88, 99; 106/31.6, 31.27, 31.13; 523/160, 161
See application file for complete search history.

(56) References Cited

U.S. PATENT DOCUMENTS

| | | | |
|---|---|---|---|
| 6,084,619 A | 7/2000 | Takemoto et al. | |
| 6,286,953 B1 | 9/2001 | Takemoto et al. | |
| 8,038,254 B2 * | 10/2011 | Arai et al. | 347/28 |
| 2004/0244622 A1 | 12/2004 | Ichinose et al. | |
| 2005/0043434 A1 | 2/2005 | Ichinose et al. | |
| 2007/0132807 A1 * | 6/2007 | Ota | 347/22 |
| 2007/0209550 A1 * | 9/2007 | Tsuru et al. | 106/31.6 |
| 2009/0202724 A1 * | 8/2009 | Arai et al. | 106/31.86 |
| 2009/0297713 A1 * | 12/2009 | Ito | 427/256 |
| 2010/0040782 A1 * | 2/2010 | Arai et al. | 106/31.6 |
| 2010/0203247 A1 * | 8/2010 | Kariya et al. | 427/256 |
| 2011/0050795 A1 * | 3/2011 | Arai et al. | 347/28 |

FOREIGN PATENT DOCUMENTS

| | | |
|---|---|---|
| JP | 9-207424 | 8/1997 |
| JP | 9-272825 | 10/1997 |
| JP | 2000-109733 | 4/2000 |
| JP | 3206797 B | 9/2001 |
| JP | 2002-030235 | 1/2002 |
| JP | 2004-331946 | 11/2004 |
| JP | 2006-124557 | 5/2006 |
| JP | 3790537 B | 6/2006 |
| JP | 2007-145928 | 6/2007 |

OTHER PUBLICATIONS

Partial English language translation for the following: Office action dated May 7, 2013 from the Japanese Patent Office in a Japanese patent application corresponding to the instant patent application. This office action translation is submitted now in order to supplement the understanding of patent document JP 2000-109733, JP2006-124557, JP9-207424, JP2002-030235, JP2004-331946, JP9-272825 and JP2007-145928.

* cited by examiner

*Primary Examiner* — Manish S Shah

(74) *Attorney, Agent, or Firm* — SOLARIS Intellectual Property Group, PLLC

(57) ABSTRACT

The present invention provides an ink set including an ink composition and a maintenance liquid that removes from a head nozzle surface a substance that is derived from the ink composition and that adheres to the head nozzle surface, the ink composition including a pigment coated with a water-insoluble polymer formed by copolymerizing a monomer mixture including a styrene macromer; polymer particles; a water-soluble organic solvent; and water.

14 Claims, No Drawings

US 8,678,577 B2

INK SET AND IMAGE FORMATION METHOD

CROSS-REFERENCE TO RELATED APPLICATION

This application claims priority under 35 USC 119 from Japanese Patent Application No. 2009-188264 filed on Aug. 17, 2009, the disclosure of which is incorporated by reference herein.

BACKGROUND OF THE INVENTION

1. Field of the Invention

The invention relates to an ink set and an image formation method.

2. Related Art

An inkjet recording method is a method of performing recording by jetting ink in the form of droplets from a large number of nozzles formed in an inkjet head toward a recording medium, and fixing the ink to the recording medium. The ink used in the inkjet recording method typically contains water as a main component, and a colorant component and an organic solvent for the purpose of preventing nozzle clogging or the like. Further, with the view of achieving a high-resolution and high-quality image, ink compositions having various compositions and an ink set using the same have been proposed.

In connection with the above, an aqueous dispersion for inkjet recording, which contains water-insoluble vinyl polymer particles including a colorant, is disclosed (for example, Japanese Patent No. 3790537). An aqueous ink containing this aqueous dispersion for inkjet recording is said to have a high degree of jetting stability and exhibit excellent print density and glossiness.

Further, an inkjet recording method in which printing is performed by depositing a reaction liquid containing a polyvalent metal salt and an ink composition containing a pigment and a resin emulsion to a recording medium is disclosed (for example, Japanese Patent No. 3206797). It is said that according to this inkjet recording method, a high-resolution and high-quality image can be printed at high speed.

SUMMARY

The present invention has been made in view of the above circumstances and provides an ink set comprising an ink composition and a maintenance liquid that removes from a head nozzle surface a substance that is derived from the ink composition and that adheres to the head nozzle surface, the ink composition comprising a pigment coated with a water-insoluble polymer formed by copolymerizing a monomer mixture comprising a styrene macromer; polymer particles; a water-soluble organic solvent; and water.

DETAILED DESCRIPTION OF THE INVENTION

In the following, details of the ink set and the image formation method according to the invention are described.

<Ink Set>

The ink set according to the invention includes an ink composition and a maintenance liquid that removes from a head nozzle surface a substance that is derived from the ink composition and that adheres to the head nozzle surface, the ink composition including a pigment coated with a water-insoluble polymer formed by copolymerizing a monomer mixture containing a styrene macromer; polymer particles; a water-soluble organic solvent; and water.

By having the above composition, the ink set according to the invention is capable of ensuring long-term jetting reliability, forming a high-quality image having favorable image glossiness, abrasion resistance, offset resistance, and increasing the speed of image formation.

The ink set according to the invention is suitably used for an inkjet recording method, but is also usable in general writing materials, recorders, pen plotters or the like.

[Ink Composition]

The ink composition according to the invention includes a pigment coated with a water-insoluble polymer formed by copolymerizing a monomer mixture containing a styrene macromer (pigment dispersion); polymer particles; a water-soluble organic solvent; and water.

The ink composition according to the invention can be used for the formation of not only a single-color image but also a full-color image, and can be used more effectively in the formation of a color image of two or more colors. In order to form a full-color image, inks having color tones of magenta, cyan and yellow can be used, and further, an ink having a black color tone can be used for adjusting the color tone. In addition, inks having other colors than yellow, magenta and cyan, such as red, green, blue and white, and inks having a spot color (for example, a colorless ink) used in the field of printing are also applicable.

—Pigment Dispersion—

The ink composition according to the invention includes at least one kind of pigment coated with a water-insoluble polymer formed by copolymerizing a monomer mixture containing a styrene macromer (pigment dispersion).

(Water-Insoluble Polymer)

The water-insoluble polymer used in the invention (hereinafter, also referred to as "second polymer") is a polymer formed by copolymerizing a monomer mixture containing a styrene macromer.

The monomer mixture includes at least (b) a styrene macromer, and preferably further includes the following components (a), (c) and (d).

(a) monomer including a group that forms a salt
(c) styrene monomer
(d) monomer represented by Formula (I): $CH_2=C(R^1)COO(R^2O)_pR^3$ (in the formula, $R^1$ represents a hydrogen atom or a lower alkyl group, $R^2$ represents a divalent hydrocarbon group having 1 to 30 carbon atoms that may have a hetero atom, $R^3$ represents a monovalent hydrocarbon group having 1 to 30 carbon atoms that may have a hetero atom, and p represents a number of from 1 to 60).

Examples of (a) monomer including a group that forms a salt include cationic monomers and anionic monomers, such as those described on page 5, column 7, line 24 to column 8, line 29 of Japanese Patent Application Laid-Open (JP-A) No. 9-286939. Representative examples of the cationic monomer include monomers containing unsaturated tertiary amine and monomers containing unsaturated ammonium salt, among which N,N-dimethylaminoethyl (meth)acrylate, N—(N',N'-dimethylaminopropyl) (meth)acrylamide and vinyl pyrrolidone are preferred. Representative examples of the anionic monomer include unsaturated carboxylic acid monomers, unsaturated sulfonic acid monomers and unsaturated phosphoric acid monomers, among which unsaturated carboxylic monomers such as acrylic acid, methacrylic acid or the like are preferred.

Examples of (b) styrene macromer include monomers having a polymerizable unsaturated group, and having a number average molecular weight of from 500 to 100,000, preferably from 1,000 to 10,000. Among these, styrene macromers having a polymerizable functional group at one terminal thereof are preferred.

(b) styrene macromer is suitably used from the viewpoint of sufficiently including the pigment in the water-insoluble polymer. Exemplary styrene macromers include a homopolymer of styrene having a polymerizable functional group at one terminal thereof and a copolymer of styrene and a further monomer. Among these, styrene macromers having an acryloyloxy group or a methacryloyloxy group as a polymerizable functional group at one terminal thereof are preferred. The content of styrene in the copolymer is 60% by mass or more, preferably 70% by mass or more, from the viewpoint that the pigment is sufficiently included in the water-insoluble polymer. Examples of the further monomer include acrylonitrile.

The monomer mixture preferably includes a silicone macromer, in addition to (b) styrene macromer, from the viewpoint of preventing "burning" (adhesion of ink to a head of an inkjet printer due to heat).

The silicone macromer is preferably a silicone macromer represented by Formula (II): $X(Y)_q Si(R^4)_{3-r}(Z)_r$ (in the formula, X represents a polymerizable unsaturated group, Y represents a divalent binding group, each of $R^4$ independently represents a hydrogen atom, a lower alkyl group, an aryl group or an alkoxy group, Z represents a residue of a monovalent siloxane polymer having a number average molecular weight of 500 or more, q represents 0 or 1, and r represents an integer of from 1 to 3).

In the silicone macromer represented by Formula (II), X represents a monovalent unsaturated hydrocarbon group having 2 to 6 carbon atoms, such as $CH_2=CH-$ or $CH_2=C(CH_3)-$. Examples of Y include divalent binding groups such as $-COO-$, $-COOC_aH_{2a}-$ (a is an integer of from 1 to 5) and a phenylene group, among which $-COOC_3H_6-$ is preferred. Examples of $R^4$ include a hydrogen atom, a lower alkyl group having 1 to 5 carbon atoms such as a methyl group or an ethyl group, an aryl group having 6 to 20 carbon atoms such as a phenyl group, and an alkoxy group having 1 to 20 carbon atoms such as a methoxy group, among which a methyl group is preferred. Z represents a monovalent residue of a dimethyl siloxane polymer having a number average molecular weight of from 500 to 5,000. q is 0 or 1, preferably 1. r is an integer of from 1 to 3, preferably 1.

Representative examples of the silicone macromer include silicone macromers represented by the following Formulae (II-1), (II-2), (II-3) and (II-4).

Formula (II-1): $CH_2=CR^5-COOC_3H_6-[Si(R^6)_2-O]_b-Si(R^6)_3$ (in the formula, $R^5$ represents a hydrogen atom or a methyl group, each of $R^6$ independently represents a hydrogen atom or a lower alkyl group having 1 to 5 carbon atoms, and b represents a number of from 5 to 60.)

Formula (II-2): $CH_2=CR^5-COO-[Si(R^6)_2-O]_b-Si(R^6)_3$ (in the formula, $R^5$, $R^6$ and b have the same definitions as the above.)

Formula (II-3): $CH_2=CR^5-Ph-[Si(R^6)_2-O]_b-Si(R^6)_3$ (in the formula, Ph represents a phenylene group, and $R^5$, $R^6$ and b have the same definitions as the above.)

Formula (II-4): $CH_2=CR^5-COOC_3H_6-Si(OE)_3$ (in the formula, $R^5$ have the same definitions as the above, E is a group represented by the formula: $-[Si(R^5)_2O]_c-Si(R^5)_3$ ($R^5$ have the same definitions as the above), and c represents a number of from 5 to 65.)

Among the above, a silicone macromer represented by Formula (II-1) is preferred, particularly preferably a silicone macromer represented by the following Formula (II-1a).

Formula (II-1a): $CH_2=C(CH_3)-COOC_3H_6-[Si(CH_3)_2-O]_d-CH_3$ (in the formula, d represents a number of from 8 to 40).

Examples of the silicone macromer represented by Formula (II-1a) include FM-0711 (trade name, available from Chisso Corporation).

In the invention, the number average molecular weight is measured by gel chromatography using chloroform containing dodecyldimethylamine (1 mmol/L) as the solvent, and polystyrene as the standard substance.

Examples of (c) styrene monomer include styrene monomers such as styrene, vinyl toluene, 2-methylstyrene and chlorostyrene. These monomers may be used alone or in combination of two ore more kinds. The term (iso or tertiary) and (iso) represents both cases in which these groups exist or do not exist, and represents normal when these groups do not exist.

From the viewpoint of improving print density and antimarker properties, (c) styrene monomer is preferably styrene or 2-methystyrene, which may be used alone or in combination.

The monomer mixture preferably further include (d) monomer represented by Formula (I): $CH_2=C(R^1)COO(R^{20})_p R^3$ (in the formula, $R^1$ represents a hydrogen atom or a lower alkyl group, $R^2$ represents a divalent hydrocarbon group having 1 to 30 carbon atoms that may have a hetero atom, $R^3$ represents a monovalent hydrocarbon group having 1 to 30 carbon atoms that may have a hetero atom, and p represents a number of from 1 to 60).

The component (d) exhibits excellent effects such as enhancing the jetting stability of the aqueous ink according to the invention, and suppressing occurrence of crinkling of a recording medium even when printing is performed in a consecutive manner. In Formula (I), $R^1$ is a hydrogen atom or a lower alkyl group. Examples of the lower alkyl group include an alkyl group having 1 to 4 carbon atoms. $R^2$ represents a divalent hydrocarbon group having 1 to 30 carbon atoms that may have a hetero atom. Examples of the hetero atom include a nitrogen atom, an oxygen atom, a halogen atom and a sulfur atom. Representative examples of $R^2$ include an aromatic ring having 6 to 30 carbon atoms that may have a substituent, a hetero ring having 3 to 30 carbon atoms that may have a substituent, and an alkylene group having 1 to 30 carbon atoms that may have a substituent. These rings or groups may be a combination of two or more kinds thereof. Examples of the substituent include an aromatic ring having 6 to 29 carbon atoms, a hetero ring having 3 to 29 carbon atoms, an alkyl group having 1 to 29 carbon atoms, a halogen atom, and an amino group. Preferred examples of $R^2$ include a phenylene group having 1 to 24 carbon atoms that may have a substituent, an aliphatic alkylene group having 1 to 30 carbon atoms, preferably 1 to 20 carbon atoms, an alkylene group having 7 to 30 carbon atoms and having an aromatic ring, and an alkylene group having 4 to 30 carbon atoms and having a hetero ring. Preferred examples of the $R^2O$ group include an ethylene oxide group, an (iso)propylene oxide group, a tetramethylene oxide group, a heptamethylene oxide group, a hexamethylene oxide group, an alkylene oxide group having 2 to 7 carbon atoms formed from a combination of at least one of the aforementioned alkylene oxide groups, and a phenyelene oxide group.

$R^3$ represents a monovalent hydrocarbon group having 1 to 30 carbon atoms that may have a hetero atom. Examples of the hetero atom include a nitrogen atom, an oxygen atom and a sulfur atom. Representative examples of $R^3$ include an aromatic ring having 6 to 30 carbon atoms that may have a substituent, a hetero ring having 3 to 30 carbon atoms that may have a substituent, and an alkyl group having 1 to 30 carbon atoms that may have a substituent. Examples of the substituent include an aromatic ring having 6 to 29 carbon atoms, a hetero ring having 4 to 29 carbon atoms, a halogen atom, and an amino group. Preferred examples of $R^3$ include a phenyl group, an aliphatic alkyl group having 1 to 30 carbon atoms, preferably 1 to 20 carbon atoms, an alkyl group having 7 to 30 carbon atoms and having an aromatic ring, and an alkyl group having 4 to 30 carbon atoms and having a hetero ring. More preferred examples of $R^3$ include an alkyl group of 1 to 6 carbon atoms such as a methyl group, an ethyl group, an (iso)propyl group, an (iso)butyl group, an (iso)pentyl group and an (iso)hexyl group, and a phenyl group.

p represents a number of from 1 to 60, preferably a number of from 1 to 30.

Specific examples of the component (d) include methoxypolyethyleneglycol (1-30: the value of p in Formula (I), hereinafter the same) (meth)acrylate, methoxypolytetramethyleneglycol (1-30) (meth)acrylate, ethoxypolyethyleneglycol (1-30) (meth)acrylate, (iso)propoxypolyethyleneglycol (1-30) (meth)acrylate, butoxypolyethyleneglycol (1-30) (meth)acrylate, methoxypolypropyleneglycol (1-30) (meth)acrylate, and methoxy(ethyleneglycol/propyleneglycol copolymer) (1-30, among which ethylene glycol: 1-29) (meth)acrylate. These compounds may be used alone or in combination of two or more kinds. Among these compounds, methoxypolyethyleneglycol (1-30) (meth)acrylate is preferred. In the present specification, "(meth)acrylate" refers to acrylate or methacrylate, and "(iso)propoxy" refers to n-propoxy or iso-propoxy.

It is also preferred that the monomer mixture further include (e) monomer including a hydroxyl group.

Examples of the component (e) include 2-hydroxyethyl (meth)acrylate, 3-hydroxypropyl (meth)acrylate, polyethyleneglycol (n=2-30) (meth)acrylate, and poly(ethyleneglycol (n=1-15).propyleneglycol (n=1-15)) (meth)acrylate. Among these, 2-hydroxyethyl (meth)acrylate is preferred.

The monomer mixture may also include a further polymerizable monomer, and examples thereof include (meth)acrylic acid esters such as methyl (meth)acrylate, ethyl (meth)acrylate, (iso)propyl (meth)acrylate, (iso or tertiary)butyl (meth)acrylate, (iso)amyl (meth)acrylate, cyclohexyl (meth)acrylate, benzyl (meth)acrylate, 2-ethylhexyl (meth)acrylate, (iso)octyl (meth)acrylate, (iso)decyl (meth)acrylate, (iso)dodecyl (meth)acrylate, and (iso)stearyl (meth)acrylate.

The content of the structural unit derived from (a) monomer including a group that forms a salt in the water-insoluble polymer is from 1 to 50% by mass, preferably from 2 to 40% by mass, in view of dispersion stability of the obtained dispersion.

The content of the structural unit derived from (b) styrene macromer in the water-insoluble polymer is from 1 to 25% by mass, preferably from 5 to 20% by mass, from the viewpoint of suppressing "burning" on the heater surface of the inkjet printer.

The content of the structural unit derived from (c) styrene monomer in the water-insoluble polymer is from 5 to 93% by mass, preferably from 10 to 80% by mass, more preferably from 10 to 60% by mass, from the viewpoint of suppressing "burning" on the heater surface of the inkjet printer.

The content of the structural unit derived from (e) monomer including a hydroxyl group in the water-insoluble polymer is from 5 to 40% by mass, preferably from 7 to 20% by mass, from the viewpoint of jetting stability and print density. Further, the total content of (a) and (e) is from 6 to 60% by mass, preferably from 10 to 50% by mass, from the viewpoint of stability in water and water resistance.

The content of (d) in the water-insoluble polymer is from 5 to 50% by mass, preferably from 10 to 40% by mass, from the viewpoint of jetting stability and dispersion stability. Further, the total content of (a) and (d) in the water-insoluble polymer is preferably from 6 to 75% by mass, from the viewpoint of dispersion stability in water and jetting stability.

Moreover, the total content of (a), (d) and (e) in the water-insoluble polymer is from 6 to 60% by mass, more preferably from 7 to 50% by mass, from the viewpoint of dispersion stability in water and jetting stability.

The water-insoluble polymer can be produced by copolymerizing the monomer mixture according to a known polymerization method, such as a mass polymerization method, a solution polymerization method, a suspension polymerization method or an emulsion polymerization method. Among these polymerization methods, a solution polymerization method is preferred.

The solvent used in the solution polymerization method is preferably a polar organic solvent, and a water-miscible organic solvent and water may be used by mixing the same. Examples of the organic solvent include aliphatic alcohols having 1 to 3 carbon atoms such as methanol, ethanol and propanol, ketones such as acetone and methyl ethyl ketone, and esters such as ethyl acetate. Among these, methanol, ethanol, acetone, methyl ethyl ketone, and a mixed solution of any of these solvents and water are preferred.

A radical polymerization initiator may be used during the polymerization, and preferred examples thereof include azo compounds such as 2,2'-azobisisobutylnitrile, 2,2'-azobis(2, 4-dimethylvaleronitrile), dimethyl-2,2'-azobisbutylate, 2,2'-azobis(2-methylbutylonitrile) and 1,1'-azobis(1-cyclohexanecarbonitrile). It is also possible to use organic peroxides such as t-butylperoxy octoate, di-t-butyl peroxide and dibenzoyl oxide. The amount of the polymerization initiator is preferably from 0.001 to 5% by mole, preferably from 0.01 to 2% by mole, with respect to the amount of the monomer mixture.

Further, a polymerization chain transfer agent may be added during the polymerization. Specific examples of the polymerization chain transfer agent include mercaptans such as octyl mercaptan, n-dodecylmercaptan, t-dodecylmercaptan, n-tetradecylmercaptan and mercaptoethanol; xanthogen disulfides such as dimethylxanthogen disulfide and diisopropylxanthogen disulfide; thiuram disulfides such as tetramethylthiuram disulfide and tetrabutylthiuram disulfide; halogenated hydrocarbons such as carbon tetrachloride and ethylene bromide; hydrocarbons such as pentaphenylethane; unsaturated cyclic hydrocarbon compounds such as acrolein, methacrolein, allyl alcohol, 2-ethylhexylthioglycolate, terpinolene, α-terpinene, γ-terpinene, dipentene, α-methylstyrene dimer, 9,10-dihydroanthracene, 1,4-dihydronaphthalene, indene and 1,4-cyclohexadiene; and unsaturated heterocyclic compounds such as 2,5-dihydrofuran. These compounds may be used alone of in combination of two or more kinds The conditions for polymerization of the monomer mixture may vary depending on the type of radical polymerization initiator, monomer or solvent, but typically the polymerization temperature is from 30 to 100° C., preferably from 50 to 80° C., and the polymerization time is from 1 to 20 hours. The polymerization atmosphere is preferably an inert gas atmosphere such as a nitrogen gas.

After the completion of polymerization reaction, a copolymer can be isolated from the reaction liquid by a known method such as performing reprecipitation or distilling away the solvent. The obtained copolymer can be purified by removing the unreacted monomers or the like by repeating reprecipitation or performing membrane separation, chromatography, extraction or the like.

The weight average molecular weight of the water-insoluble polymer is preferably from 3,000 to 200,000, more preferably from 5,000 to 100,000, from the viewpoint of jetting property, suppression of "burning" of a printer head, durability of ink after the printing, and stability of the dispersion.

(Pigment)

The ink composition according to the invention includes, in the pigment dispersion, at least one kind of a pigment coated with a water-insoluble polymer.

The type of the pigment according to the invention is not particularly limited, and conventionally known organic and inorganic pigments may be used. Exemplary organic pigments include polycyclic pigments such as azo lake, azo pigments, phthalocyanine pigments, perylene and perinone pigments, anthraquinone pigments, quinacridone pigments, dioxazine pigments, diketopyrrolopyrrole pigments, thioindigo pigments, isoindolinone pigments and quinophthalone pigments, dye lakes such as basic dye-type lake and acidic dye-type lake, nitro pigments, nitroso pigments, aniline black and daylight fluorescent pigments. Exemplary inorganic pigments include titanium oxide, iron oxide-based pigments, and carbon black. Any pigment may be used in the invention as long as it is dispersible in an aqueous phase, even if it is not listed in the color index. It is also possible to use a pigment obtained by subjecting the aforementioned pigment to a surface treatment with a surfactant or a polymer dispersant, graft carbon, and the like. Among the above, azo pigments, phthalocyanine pigments, anthraquinone pigments, quinacridone pigments and carbon black pigments are preferred.

The following are specific examples of the organic pigment that may be used in the invention.

Examples of orange or yellow organic pigments: C. I. Pigment Orange 31, C. I. Pigment Orange 43, C. I. Pigment Yellow 12, C. I. Pigment Yellow 13, C. I. Pigment Yellow 14, C. I. Pigment Yellow 15, C. I. Pigment Yellow 17, C. I. Pigment Yellow 74, C. I. Pigment Yellow 93, C. I. Pigment Yellow 94, C. I. Pigment Yellow 128, C. I. Pigment Yellow 138, C. I. Pigment Yellow 151, C. I. Pigment Yellow 155, C. I. Pigment Yellow 180, and C. I. Pigment Yellow 185.

Examples of magenta or red organic pigments: C. I. Pigment Red 2, C. I. Pigment Red 3, C. I. Pigment Red 5, C. I. Pigment Red 6, C. I. Pigment Red 7, C. I. Pigment Red 15, C. I. Pigment Red 16, C. I. Pigment Red 48:1, C. I. Pigment Red 53:1, C. I. Pigment Red 57:1, C. I. Pigment Red 122, C. I. Pigment Red 123, C. I. Pigment Red 139, C. I. Pigment Red 144, C. I. Pigment Red 149, C. I. Pigment Red 166, C. I. Pigment Red 177, C. I. Pigment Red 178, C. I. Pigment Red 222, and C. I. Pigment Violet 19.

Examples of green or cyan organic pigments: C. I. Pigment Blue 15, C. I. Pigment Blue 15:2, C. I. Pigment Blue 15:3, C. I. Pigment Blue 15:4, C. I. Pigment Blue 16, C. I. Pigment Blue 60, C. I. Pigment Green 7, and aluminum phthalocyanines having a siloxane-crosslinked structure described in the U.S. Pat. No. 4,311,775.

Examples of black organic pigments: C. I. Pigment Black 1, C. I. Pigment Black 6, and C. I. Pigment Black 7.

Other examples of the pigments include extender pigments such as silica, calcium carbonate and talc.

The amount of the pigment is from 20 to 400 parts, preferably from 50 to 300 parts, with respect to 100 parts of the resin solid content of the water-insoluble polymer, from the viewpoint of print density and ease of including the pigment in the water-insoluble polymer particles.

The aqueous dispersion of water-insoluble polymer particles including a pigment (pigment dispersion) can be obtained by, for example, dissolving the water-insoluble polymer in an organic solvent, adding the pigment to the obtained solution, performing preliminary kneading of the same, subsequently adding a neutralizer and water and kneading, producing an oil-in-water dispersion, and distilling away the organic solvent from the obtained kneaded product. Alternatively, the aqueous dispersion can be produced by adding a pigment to a water-insoluble polymer solution obtained by polymerizing the monomer mixture, and treating the same in the same manner as described above.

The organic solvent is preferably an alcohol-based solvent, a ketone-based solvent and an ether-based solvent, and a hydrophilic organic solvent is more preferred.

Examples of the alcohol-based solvent include methanol, ethanol, isopropanol, n-butanol, tertiary butanol, isobutanol and diacetonealcohol. Examples of the ketone-based solvent include acetone, methyl ethyl ketone, diethyl ketone and methyl isobutyl ketone. Examples of the ether-based solvent include dibutyl ether, tetrahydrofuran and dioxane. Among these solvents, isopropanol, acetone and methyl ethyl ketone are preferred. As necessary, these organic solvents may be used in combination with a high-boiling hydrophilic organic solvent. Examples of the high-boiling hydrophilic organic solvent include phenoxy ethanol, ethyleneglycol monomethylether, diethyleneglycol monomethylether, diethyleneglycol monoethylether and diethyleneglycol diethylether.

An acid or a base may be used as the neutralizer, according to the type of the group that forms a salt. Examples of the acid include inorganic acids such as hydrochloric acid and sulfuic acid, and organic acids such as acetic acid, propionic acid, lactic acid, succinic acid, glycolic acid, gluconic acid and glyceric acid. Examples of the base include tertiary amines such as trimethylamine and triethylamine, ammonia, sodium hydroxide and potassium hydroxide. The degree of neutralization is not particularly limited. Typically, the obtained aqueous dispersion is preferably neutral, for example, with a pH of from 4.5 to 9.

The particle diameter of the water-insoluble polymer particles including a pigment is preferably from 0.01 to 0.50 µm, more preferably from 0.02 to 0.20 µm, from the viewpoint of preventing nozzle clogging and dispersion stability. The amount of the pigment dispersion (aqueous dispersion of the water-insoluble polymer particles) in the aqueous ink is typically adjusted to a range of from 1 to 30% by mass, preferably from 2 to 15% by mass, from the viewpoint of print density and jetting stability.

—Polymer Particles—

The ink composition according to the invention includes at least one kind of polymer particles.

The polymer particles are not particularly limited, and examples thereof include particles formed from thermoplastic resins such as acrylic resin, epoxy resin, polyurethane resin, polyether resin, polyamide resin, unsaturated polyester resin, phenol resin, silicone resin and fluorine resin; polyvinyl resins such as vinyl chloride, vinyl acetate, polyvinyl alcohol and polyvinyl butyral; polyester resins such as alkyd resin and phthalic resin; and a copolymer or a mixture of these resins.

The polymer particles preferably has a function of fixing the ink composition, i.e., the image, by increasing the viscosity of the ink. The viscosity of the ink can be increased by allowing the ink to coagulate upon contact with a reaction liquid that can form a coagulation when it contacts the later-described ink composition, or contact with a portion of the paper on which the reaction liquid has been applied and dried; or by disturbing the dispersed state of the ink. Polymer particles as mentioned above are preferably dispersed in at least one kind of water or an organic solvent.

In the invention, the polymer particles preferably have a glass transition temperature (Tg) of 80° C. or higher. By including the polymer particles having a Tg of 80° C. or higher, it is possible to effectively improve the fixability of the ink composition to a recording medium, as well as the blocking resistance, offset resistance and abrasion resistance of the image. The Tg of the polymer particles is preferably from 80° C. to 220° C., more preferably from 100° C. to 200° C.

The Tg of the polymer particles can be controlled as appropriate by an ordinary method. For example, the Tg of the polymer particles can be controlled to be within a desired range by appropriately selecting the type of polymerizable group of the monomer that forms the polymer, type or component ratio of the substituent on the monomer, molecular weight of the polymer molecule that forms the polymer particles, or the like.

The measured Tg obtained by actual measurement can be applied to the Tg of the polymer particles. Specifically, the measured Tg refers to a value measured by using a differential scanning calorimeter (DSC) (EXSTAR 6220, trade name, available from SII NanoTechnology Inc.) under ordinary measurement conditions. When the measurement is difficult to carry out due to decomposition of the resin or the like, the calculated Tg, which is calculated by the following expression, is applied. The calculated Tg is obtained by the following expression (1).

$$1/Tg = \Sigma(X_i/Tg_i) \qquad (1)$$

In the above expression, the polymer whose Tg is to be calculated is assumed to be formed by copolymerizing n-kinds of monomer components (i=1 to n). $X_i$ represents the weight fraction of the i-th monomer ($\Sigma X_i = 1$) and $Tg_i$ represents a glass transition temperature (absolute temperature) of a homopolymer of the i-th monomer. $\Sigma$ is the sum of i=1 to n. The values of glass transition temperature described in Polymer Handbook (3rd Edition, authored by J. Brandup and E. H. Immergut, published by Wiley-InterScience, 1989) are used as the value of glass transition temperature of a homopolymer of each monomer ($Tg_i$).

In the ink composition according to the invention, a content of the polymer particles (mass of resin solid content) is preferably greater than a content of the pigment (mass of pigment solid content), from the viewpoint of improving the abrasion resistance, blocking resistance and offset resistance. In the invention, the mass ratio (a)/(b) of solid content of the polymer particles (a) and the pigment (b) is preferably from 1 to 10, more preferably from 1.2 to 5.

In the invention, the polymer particles are preferably self-dispersible polymer particles, more preferably self-dispersible polymer particles having a carboxyl group, from the viewpoint of imparting jetting stability, liquid stability when a pigment is used (in particular, dispersion stability) and suitability to high-speed inkjet printing.

The self-dispersible polymer particles used in the invention refers to microparticles of a water-insoluble polymer (also referred to as "first polymer") that can be in a dispersed state in an aqueous medium by means of a functional group (in particular, an acidic group or a salt thereof) of the polymer itself, in the absence of other surfactants, and does not include an emulsifier being in a free state.

The dispersed state as mentioned above refers to both of an emulsified state (emulsion) in which the water-insoluble polymer is dispersed in an aqueous medium in the form of a liquid, and a suspended state (suspension) in which the water-insoluble polymer is dispersed in an aqueous medium in the form of a solid.

In the invention, the water-insoluble polymer is preferably a water-insoluble polymer that can be in a dispersed state in the form of a solid, from the viewpoint of the rate of coagulation of the ink when included in the ink composition, and the fixability of the ink.

In the invention, the dispersed state of the self-dispersible polymer particles refers to a state whose existence can be visually confirmed in a stable manner for at least one week at 25° C., even after the preparation of a mixture of a solution including 30 g of the water-insoluble polymer dissolved in 70 g of an organic solvent (for example, methyl ethyl ketone), a neutralizer that can neutralize the group that forms a salt of the water-insoluble polymer by 100% (sodium hydroxide when the group that forms a salt is anionic, or acetic acid when the group that forms a salt is cationic) and 200 g of water; stirring this mixture (using a device having stirring blades, at a rotation rate of 200 rpm for 30 minutes at 25° C.); and then removing the organic solvent from this mixture.

Further, the water-insoluble polymer refers to a polymer that dissolves, after being dried for 2 hours at 105° C., in 100 g of water at 25° C. in an amount of dissolution of 10 g or less, preferably 5 g or less, more preferably 1 g or less. The amount of dissolution refers to an amount of dissolution of the water-insoluble polymer when it is neutralized by 100% with sodium hydroxide or acetic acid according to the type of the group that forms a salt of the water-insoluble polymer.

The aqueous medium includes water, and may further include a hydrophilic organic solvent as necessary. In the invention, the aqueous medium is preferably formed from water and a hydrophilic organic solvent in an amount of not more than 0.2% by mass with respect to the water, more preferably formed only from water.

The main skeleton of the water-insoluble polymer is not particularly limited, and examples thereof include a vinyl polymer or a condensed polymer (such as epoxy resin, polyester, polyurethane, polyamide, cellulose, polyether, polyurea, polyimide and polycarbonate). Among these, vinyl polymer is particularly preferred.

Suitable examples of the vinyl polymer and the monomer that constitutes the vinyl polymer include those described in JP-A No. 2001-181549 and JP-A No. 2002-88294. It is also possible to use a vinyl polymer having a dissociable group introduced in a terminal end of a polymer chain thereof, the introduction being performed by radical polymerization of a vinyl monomer using a chain transfer agent or a polymerization initiator having a dissociable group (or a substituent from which a dissociable group can be derived) or an iniferter, or by ion polymerization using a compound having a dissociable group (or a substituent from which a dissociable group can be derived) as an initiator or a terminator.

Suitable examples of the condensed polymer and the monomer that constitutes the condensed polymer include those described in JP-A No. 2001-247787.

The self-dispersible polymer particles used in the invention preferably include a water-insoluble polymer that has a hydrophilic structural unit and, as a hydrophobic unit, a structural unit derived from an aromatic group-containing monomer or an alicyclic group-containing monomer, from the viewpoint of self-dispersibility. The hydrophobic structural unit is more preferably derived from an alicyclic group-containing (meth)acrylate (hereinafter, also referred to as "alicyclic (meth)acrylate") from the viewpoint of blocking resistance, abrasion resistance and dispersion stability.

The alicylic (meth)acrylate refers to a monomer having a structural unit derived from (meth)acrylic acid and a structural unit derived from alcohol, the structural unit derived from alcohol having a structure including at least one substituted or unsubstituted alicyclic hydrocarbon group (alicyclic group). The alicyclic hydrocarbon group may be the structural unit derived from alcohol itself, or may be bound to the structural unit derived from alcohol via a binding group.

The "alicyclic (meth)acrylate" refers to methacylate or acrylate having an alicyclic hydrocarbon group.

The hydrophilic structural unit is not particularly limited as long as it is derived from a hydrophilic group-containing monomer, and the hydrophilic structural unit may be derived from one kind of hydrophilic group-containing monomer, or may be derived from two or more kinds thereof. The type of the hydrophilic group is not particularly limited, and may be a dissociable group or a nonionic hydrophilic group.

In the invention, the hydrophilic group is preferably a dissociable group, from the viewpoint of promoting self-dispersion or stability in the formed emulsified or dispersed state, and more preferably an anionic dissociable group. Examples of the dissociable group include a carboxyl group, a phosphoric acid group and a sulfonic acid group. Among these, a carboxyl group is preferred from the viewpoint of fixability when the ink composition is structured.

In the invention, the hydrophilic group-containing monomer is preferably a dissociable group-containing monomer, from the viewpoint of self-dispersibility and coagulability, more preferably a dissociable group-containing monomer that has a dissociable group and an ethylenic unsaturated bond.

Examples of the dissociable group-containing monomer include an unsaturated carboxylic acid monomer, an unsaturated sulfonic acid monomer and an unsaturated phosphoric acid monomer.

Specific examples of the unsaturated carboxylic monomer include acrylic acid, methacrylic acid, crotonic acid, itaconic acid, maleic acid, fumaric acid, citraconic acid and 2-methacryloyloxymethyl succinic acid. Specific examples of the unsaturated sulfonic acid monomer include styrenesulfonic acid, 2-acrylamide-2-methylpropane sulfonic acid, 3-sulfopropyl(meth)acrylate and bis-(3-sulfopropyl)-itaconic acid ester. Specific examples of the unsaturated phosphoric acid monomer include vinyl phosphonic acid, vinyl phosphate, bis(methacryloxyethyl) phosphate, diphenyl-2-acryloyloxyethyl phosphate, diphenyl-2-methacryloyloxyethyl phosphate and dibutyl-2-acryloyloxyethyl phosphate.

Among these dissociable group-containing monomers, unsaturated carboxylic acid monomers are preferred, and acrylic acid and methacylic acid are more preferred, from the viewpoint of dispersion stability and jetting stability.

In the invention, from the viewpoint of self-dispersibility and coagulation rate upon contact with the reaction liquid, the self-dispersible polymer particles preferably have a carboxyl group and include a first polymer having an acid value (mgKOH/g) of from 25 to 100. Further, from the viewpoint of self-dispersibility and coagulation rate upon contact with the reaction liquid, the acid value is more preferably from 25 to 80, and particularly preferably from 30 to 65.

When the acid value is 25 or greater, favorable stability in self-dispersibility can be achieved, and when the acid value is 100 or lower, coagulability can be improved. Further, the acid value of the self-dispersible polymer is preferably lower than the acid value of the water-insoluble polymer (second polymer) in view of achieving both the dispersion stability of the pigment and the coagulation rate upon contact with the reaction liquid. The difference between these acid values is more preferably from 5 to 70, particularly preferably from 10 to 70.

The aromatic group-containing monomer is not particularly limited as long as it is a compound that includes an aromatic group and a polymerizable group. The aromatic group may be a group derived from an aromatic hydrocarbon or a group derived from an aromatic heterocyclic ring. In the invention, the aromatic group is preferably derived from an aromatic hydrocarbon, from the viewpoint of particle shape stability in an aqueous medium.

Further, the polymerizable group may be a condensation-polymerizable group or an addition-polymerizable group. In the invention, the polymerizable group is preferably an addition-polymerizable group, more preferably a group including an ethylenic unsaturated bond, from the viewpoint of particle shape stability in an aqueous medium.

In the invention, the aromatic group-containing monomer is preferably a monomer having an aromatic group derived from an aromatic hydrocarbon and an ethylenic unsaturated bond, more preferably an aromatic group-containing (meth)acrylate monomer.

In the invention, the aromatic group-containing monomer may be used alone or in combination of two or more kinds.

Examples of the aromatic group-containing monomer include phenoxyethyl (meth)acrylate, benzyl (meth)acrylate, phenyl (meth)acrylate, and styrene monomers. Among these, from the viewpoint of the balance between hydrophilicity and hydrophobicity of the polymer chain and fixability of the ink, the aromatic group-containing monomer is preferably at least one selected from phenoxymethyl (meth)acrylate, benzyl (meth)acrylate or phenyl (meth)acrylate, more preferably phenoxyethyl (meth)acrylate, particularly preferably phenoxyethyl acrylate.

The term "(meth)acrylate" refers to acrylate or methacrylate.

The alicyclic hydrocarbon group is not particularly limited as long as it includes a cyclic non-aromatic hydrocarbon group, and examples thereof include a monocyclic hydrocarbon group, a bicyclic hydrocarbon group and a tricyclic hydrocarbon group. Specific examples of the alicyclic hydrocarbon group include a cycloalkyl group such as a cyclopentyl group or a cyclohexyl group, a cycloalkenyl group, a bicyclohexyl group, a norbornyl group, an isobornyl group, a dicyclopentanyl group, a dicyclopentenyl group, an adamantyl group, a decahydronaphthalenyl group, a perhydrofluorenyl group, a tricyclo[5.2.1.0$^{2,6}$]decanyl group and bicyclo[4.3.0]nonane.

The alicyclic hydrocarbon group may have a substituent, and examples thereof include an alkyl group, an alkenyl group, an aryl group, an aralkyl group, an alkoxy group, a hydroxyl group, a primary amino group, a secondary amino group, a tertiary amino group, an alkyl or aryl carbonyl group, and a cyano group. Further, the alicyclic hydrocarbon group may form a condensed ring. The carbon number of the alicyclic hydrocarbon group portion of the alicyclic hydrocarbon group used in the invention is preferably 5 to 20, from the viewpoint of viscosity and solubility.

Preferred examples of the binding group that binds the alicyclic hydrocarbon group and the structural unit derived from alcohol include the following groups having 1 to 20 carbon atoms: an alkyl group, an alkenyl group, an alkylene group, an aralkyl group, an alkoxy group, a mono- or oligoethyleneglycol group, and a mono- or oligopropyleneglycol group.

The following are specific examples of the alicyclic (meth)acrylate used in the invention, but the invention is not limited thereto.

Examples of the monocyclic (meth)acrylate include cycloalkyl (meth)acrylates having 3 to 10 carbon atoms such as cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, cyclononyl (meth)acrylate and cyclodecyl (meth)acrylate.

Examples of the bicyclic (meth)acrylate include isobornyl (meth)acrylate and norbornyl (meth)acrylate.

Examples of the tricyclic (meth)acrylate include adamantyl (meth)acrylate, dicyclopentanyl (meth)acrylate and dicyclopentenyloxyethyl (meth)acrylate.

These alicyclic (meth)acrylates may be used alone or in combination of two or more kinds Among the above, from the viewpoint of dispersion stability of the self-dispersible polymer particles, fixability and blocking resistance, the alicyclic (meth)acrylate is preferably at least one kind of bicyclic (meth)acrylate or a polycyclic (meth)acrylate having a tri- or higher-cyclic structure, more preferably at least one kind selected from isobornyl (meth)acrylate, adamantyl (meth)acrylate or dicyclopentanyl (meth)acrylate.

The self-dispersible polymer used in the invention is preferably an acryl-based resin including a structural unit derived from a (meth)acrylate monomer, more preferably an acryl-based resin including a structural unit derived from an aromatic group-containing (meth)acrylate or an alicyclic (meth)acrylate, further preferably an acryl-based resin including a structural unit derived from an aromatic group-containing (meth)acrylate or an alicyclic (meth)acrylate at a content ratio of from 10% by mass to 95% by mass. When the content ratio of the aromatic group-containing (meth)acrylate or the alicyclic (meth)acrylate is from 10% by mass to 95% by mass, stability in the state of self-emulsification or self-dispersion can be improved, and further, increase in ink viscosity can be suppressed. In the invention, from the viewpoint of stability in the self-dispersed state, stability in particle shape in an aqueous medium due to interaction among the aromatic rings or among the alicyclic hydrocarbon groups, and decrease in the content of water-soluble components due to appropriate hydrophobization of the particles, the above content ratio is more preferably from 15% by mass to 90% by mass, further preferably from 15% by mass to 80% by mass, yet further preferably from 25% by mass to 70% by mass.

The self-dispersible polymer used in the invention may be formed, for example, by using a structural unit derived from an aromatic group-containing monomer or an alicyclic group-containing monomer, and a structural unit derived from a dissociative group-containing monomer. A further structural unit may be included in the self-dispersible polymer, as necessary.

The monomer that forms the further structural unit is not particularly limited, as long as it can copolymerize with the aromatic group-containing monomer or the alicyclic group-containing monomer, and with the dissociative group-containing monomer. Among these, an alkyl group-containing monomer is preferred from the viewpoint of flexibility of the polymer skeleton and ease of controlling a glass transition temperature (Tg).

Examples of the alkyl group-containing monomer include (meth)acrylic ester-based monomers and (meth)acrylamide-based monomers.

Examples of the (meth)acrylic ester-based monomer include alkyl (meth)acrylates such as methyl (meth)acrylate, ethyl (meth)acrylate, isopropyl (meth)acrylate, n-propyl (meth)acrylate, n-butyl (meth)acrylate, isobutyl (meth)acrylate, t-butyl (meth)acrylate, hexyl (meth)acrylate and ethylhexyl (meth)acrylate; ethylenically unsaturated monomers having a hydroxyl group such as hydroxymethyl (meth)acrylate, 2-hydroxyethyl (meth)acrylate, 2-hydroxypropyl (meth)acrylate, 4-hydroxybutyl (meth)acrylate, hydroxypentyl (meth)acrylate and hydroxyhexyl (meth)acrylate; and dialkylaminoalkyl (meth)acrylate such as dimethylaminoethyl (meth)acrylate.

Examples of the (meth)acrylamide-based monomers include N-hydroxyalkyl (meth)acrylamides such as N-hydroxymethyl (meth)acrylamide, N-hydroxyethyl (meth)acrylamide and N-hydroxybutyl (meth)acrylamide; and N-alkoxyalkyl (meth)acrylamides such as N-methoxymethyl (meth)acrylamide, N-ethoxymethyl (meth)acrylamide, N-(n-, iso)butoxymethyl (meth)acrylamide, N-methoxyethyl (meth)acrylamide, N-ethoxyethyl (meth)acrylamide and N-(n-, iso)butoxyethyl (meth)acrylamide.

The range of molecular weight of the water-insoluble polymer that constitutes the self-dispersible polymer used in the invention is preferably from 3,000 to 200,000, more preferably from 5,000 to 150,000, further preferably from 10,000 to 100,000, in terms of weight average molecular weight. When the weight average molecular weight is 3,000 or more, the amount of water-soluble components can be effectively suppressed. Further, when the weight average molecular weight is 200,000 or less, self-dispersion stability can be enhanced.

The weight average molecular weight can be measured using a gel permeation chromatography (GPC). The GPC can be performed by HLC-8220 GPC (trade name, available from Tosoh Corporation) using three columns (TSKgeL Super HZM-H, TSKgeL Super HZ4000 and TSKgeL Super HZ2000, trade name, available from Tosoh Corporation, 4.6 mmID×15 cm) and THF (tetrahydrofuran) as an eluent.

The water-insoluble polymer that constitutes the self-dispersible polymer fine particles used in the invention preferably includes a structural unit derived from an aromatic group-containing (meth)acrylate or an alicyclic (meth)acrylate (preferably a structural unit derived from phenoxyethyl (meth)acrylate and/or a structural unit derived from benzyl (meth)acrylate, or isobornyl (meth)acrylate and/or adamantyl (meth)acrylate and/or dicyclopentanyl (meth)acrylate) at a copolymerization ratio of from 15 to 80% by mass with respect to the total mass of the self-dispersible polymer particles, from the viewpoint of controlling hydrophilicity and hydrophobicity of the polymer.

Further, from the viewpoint of controlling hydrophilicity and hydrophobicity of the polymer, the water-insoluble polymer preferably includes a structural unit derived from an aromatic group-containing (meth)acrylate or an alicyclic (meth)acrylate at a copolymerization ratio of from 15 to 80% by mass, a structural unit derived from a carboxyl group-containing monomer, and a structural unit derived from an alkyl group-containing monomer (preferably a structural unit derived from an alkyl ester of (meth)acrylic acid).

Further, the water-insoluble polymer more preferably includes a structural unit derived from phenoxyethyl (meth)acrylate and/or a structural unit derived from benzyl (meth)acrylate, or a structural unit derived from isobornyl (meth)acrylate and/or adamantyl (meth)acrylate and/or dicyclopentanyl (meth)acrylate at a copolymerization ratio of from 15 to 80% by mass, a structural unit derived from a carboxyl group-containing monomer, and a structural unit derived from an alkyl group-containing monomer (preferably a structural unit derived from an alkyl ester of (meth)acrylic acid having 1 to 4 carbon atoms).

Additionally, the water-insoluble polymer preferably has an acid value of from 25 to 100 and a weight average molecular weight of from 3,000 to 200,000, more preferably has an acid value of from 25 to 95 and a weight average molecular weight of from 5,000 to 150,000.

The following exemplary compounds B-01 to B-19 and C-01 to C-05 are specific examples of the water-insoluble polymer that constitutes the self-dispersible polymer particles. However, the invention is not limited thereto. The numbers in the parenthesis refer to the mass ratio of the copolymerization components.

B-01: phenoxyethyl acrylate/methyl methacrylate/acrylic acid copolymer (50/45/5)

B-02: phenoxyethyl acrylate/benzyl methacrylate/isobutyl methacrylate/methacrylic acid copolymer (30/35/29/6)

B-03: phenoxyethyl methacrylate/isobutyl methacrylate/methacrylic acid copolymer (50/44/6)

B-04: phenoxyethyl acrylate/methyl methacrylate/ethyl acrylate/acrylic acid copolymer (30/55/10/5)

B-05: benzyl methacrylate/isobutyl methacrylate/methacrylic acid copolymer (35/59/6)

B-06: styrene/phenoxyethyl acrylate/methyl methacrylate/acrylic acid copolymer (10/50/35/5)

B-07: benzyl acrylate/methyl methacrylate/acrylic acid copolymer (55/40/5)

B-08: phenoxyethyl methacrylate/benzyl acrylate/methacrylic acid copolymer (45/47/8)

B-09: styrene/phenoxyethyl acrylate/butyl methacrylate/acrylic acid copolymer (5/48/40/7)

B-10: benzyl methacrylate/isobutyl methacrylate/cyclohexyl methacrylate/methacrylic acid copolymer (35/30/30/5)

B-11: phenoxyethyl acrylate/methyl methacrylate/butyl acrylate/methacrylic acid copolymer (12/50/30/8)

B-12: benzyl acrylate/isobutyl methacrylate/acrylic acid copolymer (93/2/5)

B-13: styrene/phenoxyethyl methacrylate/butyl acrylate/acrylic acid copolymer (50/5/20/25)

B-14: styrene/butyl acrylate/acrylic acid copolymer (62/35/3)

B-15: methyl methacrylate/phenoxyethyl acrylate/acrylic acid copolymer (45/51/4)

B-16: methyl methacrylate/phenoxyethyl acrylate/acrylic acid copolymer (45/49/6)

B-17: methyl methacrylate/phenoxyethyl acrylate/acrylic acid copolymer (45/48/7)

B-18: methyl methacrylate/phenoxyethyl acrylate/acrylic acid copolymer (45/47/8)

B-19: methyl methacrylate/phenoxyethyl acrylate/acrylic acid copolymer (45/45/10)

C-01: methyl methacrylate/isobornyl methacrylate/methacrylic acid copolymer (20/72/8, glass transition temperature: 180° C.)

C-02: methyl methacrylate/isobornyl methacrylate/methacrylic acid copolymer (40/52/8, glass transition temperature: 160° C.)

C-04: methyl methacrylate/isobornyl methacrylate/dicyclopentanyl methacrylate/methacrylic acid copolymer (20/62/10/8, glass transition temperature: 170° C.)

C-05: methyl methacrylate/dicyclopentanyl methacrylate/methacrylic acid copolymer (20/72/8, glass transition temperature: 160° C.)

In the invention, the method of producing the water-insoluble polymer that constitutes the self-dispersible polymer particles is not particularly limited, and exemplary methods include a method of performing emulsification polymerization under the presence of a polymerizable surfactant so as to allow the water-insoluble polymer to be covalently bound to the surfactant; and a method of copolymerizing the monomer mixture including a hydrophilic group-containing monomer and an aromatic group-containing monomer by a known polymerization method such as solution polymerization or mass polymerization. Among these polymerization methods, a solution polymerization method is preferred from the viewpoint of coagulation rate and jetting stability of the ink composition, and a solution polymerization method using an organic solvent is more preferred.

In the invention, from the viewpoint of coagulation rate, the self-dispersible polymer particles preferably include a first polymer synthesized in an organic solvent, the first polymer including a carboxyl group and having an acid value of from 25 to 100, the carboxyl groups of the first polymer being at least partly neutralized, and the self-dispersible polymer being prepared as a polymer dispersion in which water forms a continuous phase.

Specifically, the method of producing the self-dispersible polymer particles used in the invention preferably includes a process of synthesizing the first polymer in an organic solvent, and a dispersing process of preparing an aqueous dispersion in which at least part of the carboxyl groups of the first polymer is neutralized.

The dispersing process preferably includes the following step (1) and step (2).

Step (1): stirring a mixture containing the first polymer (water-insoluble polymer), an organic solvent, a neutralizer and an aqueous medium.

Step (2): removing the organic solvent from the mixture.

The step (1) is preferably a step of obtaining a dispersion by dissolving the first polymer (water-insoluble polymer) in the organic solvent, gradually adding the neutralizer and the aqueous medium thereto and mixing, and stirring the same. By adding the neutralizer and the aqueous medium to the solution prepared by dissolving the water-insoluble polymer in the organic solvent in this manner, it is possible to obtain self-dispersible polymer particles having a particle diameter that achieves further improved storage stability, without using a strong shear force.

The method of stirring the mixture is not particularly limited and a commonly used mixing-and-stirring device may be used. As necessary, an ultrasonic disperser or a high-pressure homogenizer are also applicable.

Preferred examples of the organic solvent include alcohol-based solvents, ketone-based solvents and ether-based solvents.

Examples of the alcohol-based solvents include isopropyl alcohol, n-butanol, t-butanol and ethanol. Examples of the ketone-based solvents include acetone, methyl ethyl ketone, diethyl ketone and methyl isobutyl ketone. Examples of the ether-based solvents include dibutylether and dioxane. Among these solvents, ketone-based solvents such as methyl ethyl ketone and alcohol-based solvents such as isopropyl alcohol are preferred. Further, in order to achieve a mild polarity change during phase transition from the oil-based system to the water-based system, it is also preferred to use isopropyl alcohol and methyl ethyl ketone in combination. By using these solvents in combination, it is possible to obtain self-dispersible polymer particles that do not cause aggregation/sedimentation or fusion of the particles, and have a fine particle diameter that achieves favorable dispersion stability.

The neutralizer is used in order to form a stable emulsified or dispersed state of the self-dispersible polymer in water in which all or part of the dissociative groups are neutralized. When the self-dispersible polymer has an anionic dissociative group (for example, a carboxyl group) as the dissociative group, the neutralizer to be used may be a basic compound such as an organic amine compound, ammonia, or a hydroxide of an alkali metal. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-dimethylamino-2-methyl-1-propanol, 2-amino-2-methyl-1-propanol, N-methyldiethanolamine, N-ethyldiethanolamine, monoisopropanolamine, diisopropanolamine and triisopropanolamine. Examples of the hydroxide of an alkali metal include lithium hydroxide, sodium hydroxide and potassium hydroxide. Among these basic compounds, from the viewpoint of dispersion stability of the self-dispersible polymer particles in water, sodium hydroxide, potassium hydroxide, triethylamine and triethanolamine are preferred.

These basic compounds are preferably used in an amount of from 5 to 120 mol %, more preferably from 10 to 110 mol %, further preferably from 15 to 100 mol %, with respect to 100 mol % of the dissociative group. When the amount of the basic compound is 15 mol % or more, the effect of stabilizing the dispersion of particles in water can be achieved, and when the amount of the basic compound is 100 mol % or less, the effect of reducing the amount of water-soluble components can be achieved.

In step (2), an aqueous dispersion of the self-dispersible polymer particles can be obtained by allowing phase transition of the dispersion obtained in step (1) to an aqueous system, by removing the organic solvent therefrom in accordance with an ordinary process such as reduced-pressure distillation. The organic solvent is substantially removed from the obtained aqueous dispersion, and the amount thereof in the dispersion is preferably 0.2% by mass or less, more preferably 0.1% by mass or less.

In the invention, the average particle diameter of the self-dispersible polymer particles is preferably in the range of from 10 to 400 nm, more preferably from 10 to 200 nm, further preferably from 10 to 100 nm. When the average particle diameter is 10 nm or greater, production suitability can be improved. When the average particle diameter is 400 nm or smaller, storage stability can be improved.

The particle diameter distribution of the self-dispersible polymer particles is not particularly limited, and either the self-dispersible polymer particles having a broad particle diameter distribution or the self-dispersible polymer particles having a monodispersed particle diameter distribution may be used. Further, two or more kinds of water-insoluble particles may be used in combination.

The average particle diameter and the particle diameter distribution of the self-dispersible polymer particles can be measured by, for example, a light-scattering method.

The self-dispersible polymer particles used in the invention can be suitably included in, for example, an aqueous ink composition. It is possible to use only one kind of self-dispersible polymer particles, or two or more kinds thereof in combination.

—Water-Soluble Organic Solvent—

The ink composition according to the invention includes water as a solvent, and further includes at least one kind of water-soluble organic solvent. The water-soluble organic solvent may be included in the ink composition as an anti-drying agent or a penetration promotor.

In particular, when the ink composition is used in an image formation method employing an inkjet technique, the anti-drying agent can effectively suppress the clogging of nozzles that may occur due to the drying of ink at the ejection port of the nozzles.

The anti-drying agent is preferably a water-soluble organic solvent having a vapor pressure that is lower than that of water. Specific examples of the anti-drying agent include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin and trimethylol propane; lower alkyl ethers of polyhydric alcohol such as ethylene glycol monomethyl (or ethyl)ether, diethylene glycol monomethyl (or ethyl)ether and triethylene glycol monoethyl (or butyl)ether; heterocyclic compounds such as 2-pyrrolidone, N-methyl-2-pyrrolidone, 1,3-dimethyl-2-imidazolidinone and N-ethylmorpholine; sulfur-containing compounds such as sulfolane, dimethyl sulfoxide and 3-sulfolene; polyfunctional compounds such as diacetone alcohol and diethanolamine; and urea derivatives. Among these compounds, polyhydric alcohols such as glycerin and diethylene glycol are preferred as an anti-drying agent. The anti-drying agent may be used alone or in combination of two or more kinds. The anti-drying agent is preferably included in the ink composition in an amount of from 10 to 50% by mass.

The penetration promotor is suitably used for the purpose of improving the penetration of ink into the recording medium (printing paper). Specific examples of the penetration promotor include alcohols such as ethanol, isopropanol, butanol, di (or tri) ethylene glycol monobutyl ether and 1,2-hexanediol, sodium lauryl sulfate, sodium oleate, and nonionic surfactants. The penetration promoter can exhibit sufficient effects when it is included in the ink composition in an amount of from 5 to 30% by mass. Further, the penetration promotor is preferably used within a range of amount that does not cause print-bleeding or print-through.

The water-soluble organic solvent may be used in order to adjust the viscosity, in addition to the aforementioned purposes. Specific examples of the water-soluble organic solvent that may be used for the purpose of adjusting the viscosity include alcohols (such as methanol, ethanol, propanol, isopropanol, butanol, isobutanol, sec-butanol, t-butanol, pentanol, hexanol, cyclohexanol and benzylalcohol); polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerin, hexane triol and thiodiglycol); glycol derivatives (such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether and ethylene glycol monophenyl ether); amines (such as ethanolamine, diethanolamine, triethanolamine, N-methyldiethanolamine, N-ethyldiethanolamine, morpholine, N-ethylmorpholine, ethylenediamine, diethylene triamine, triethylene tetramine, polyethyleneimine and tetramethylpropylenediamine); and other polar solvents (such as formamide, N,N-dimethylforamide, N,N-dimethylacetoamide, dimethylsulfoxide, sulfolane, N-pyrrolidone, N-methyl-2-pyrrolidone, N-vinyl-2-pyrrolidone, 2-oxazolidone, 1,3-dimethyl-2-imidazolidinone, acetonitrile and acetone).

The water-soluble organic solvent may be used alone or in combination of two or more kinds —Solvents Having SP Value of 27.5 or Less—

The ink composition according to the invention preferably includes a solvent having an SP value of 27.5 or less as a water-soluble organic solvent. The solvent may be the solvents described in the section concerning the later-described maintenance liquid, and preferred examples thereof are also the same. The solvent may be used alone or in combination of two or more kinds.

In the ink composition according to the invention, the content of the total water-soluble organic solvents in the ink composition is not particularly limited, but preferably from 10 to 50%, more preferably from 15 to 25%, from the viewpoint of securing stability and jetting reliability of the ink composition.

The ratio of the solvent having an SP value of 27.5 or less with respect to the total water-soluble organic solvents in the ink composition is preferably 10% or more, more preferably 30% or more, particularly preferably 50% or more, from the viewpoint of improving halftone glossiness, suppressing curling, and improving solubility of a solid substance derived from the ink composition.

—Water—

The ink composition according to the invention contains water as a solvent. The amount of water is not particularly limited, but is preferably from 10% by mass to 99% by mass, more preferably from 30% by mass to 80% by mass, further preferably from 50% by mass to 70% by mass, with respect to the total mass of the ink composition, from the viewpoint of securing stability and jetting reliability.

—Other Additives—

The ink composition according to the invention may include other additives as necessary, in addition to the essential components as mentioned above. Example of the other additives include known additives such as a discoloration inhibitor, an emulsification stabilizer, a penetration promotor, a UV absorber, an antiseptic agent, a fungicide, a pH adjuster, a surface tension adjuster, a defoaming agent, a viscosity adjuster, a dispersant, a dispersion stabilizer, an antirust agent, and a chelate agent. These additives may be added directly after the preparation of the ink composition, or may be added during the preparation of the ink composition.

The UV absorber is used for the purpose of improving storability of the image. Examples of the UV absorber include the benzotriazole-based compounds described in JP-A No. 58-185677, JP-A No. 61-190537, JP-A No. 2-782, JP-A No. 5-197075 and JP-A No. 9-34057; the benzophenone compounds described in JP-A No. 46-2784, JP-A No. 5-194483 and the U.S. Pat. No. 3,214,463; the cinnamic acid-based compounds described in Japanese Patent No. 48-304092, Japanese Patent No. 56-21141 and JP-A No. 10-88106; the triazine-based compounds such as JP-A No. 4-298503, JP-A No. 8-53427, JP-A No. 8-239368, JP-A No. 10-182621 and Japanese National Publication No. 8-501291; the compounds described in Research Disclosure No. 24239; and the compounds that absorb UV rays and emit fluorescent light, as represented by stilbene-based compounds and benzoxazole-based compounds.

The discoloration inhibitor is used for the purpose of improving storability of the image. Various organic-based and metal complex-based discoloration inhibitors may be used. Examples of the organic discoloration inhibitors include hydroquinones, alkoxyphenols, dialkoxyphenols, phenols, anilines, amines, indanes, chromanes, alkoxyanilines and heterocyclic compounds. Examples of the metal complexes include nickel complexes and zinc complexes. More specific examples include the compounds described in the patent documents recited in Research Disclosure No. 17643, VII, Ito J; Research Disclosure No. 15162; Research Disclosure No. 18716, page 650, left column; Research Disclosure No. 36544, page 527; Research Disclosure No. 307105, page 872; Research Disclosure No. 15162; and the compounds included in the general formulae and examples of representative compounds described in JP-A No. 62-215272, pages 127-137.

Examples of the fungicides include sodium dehydroacetate, sodium benzoate, sodium pyridinethion-1-oxide, p-hydroxybenzoic acid ethyl ester, 1,2-benzisothiazolin-3-one, and a salt of thereof. The fungicide is preferably used in the aqueous ink composition in an amount of from 0.02 to 1.00% by mass.

A neutralizer (organic base and inorganic alkali) may be used as a pH adjuster. The pH adjuster is preferably added to the aqueous ink composition such that the pH thereof is adjusted to the range of from pH 6 to pH 10, more preferably from pH 7 to pH 10, from the viewpoint of improving storage stability of the aqueous ink composition.

A nonionic surfactant, a cationic surfactant, an anionic surfactant, a betaine surfactant and the like may be used as a surface tension adjuster.

The surface tension adjuster is preferably added to the aqueous ink composition such that the surface tension thereof is adjusted to the range of from 20 to 60 mN/m, more preferably from 25 to 45 mN/m, further preferably from 25 to 40 mN/m, from the viewpoint of performing favorable discharge in an inkjet technique.

The surface tension of the ink composition can be measured, for example, by a plate method.

Specific examples of the surfactant include hydrocarbon surfactants, in which anionic surfactants and nonionic surfactants are preferred.

Exemplary anionic surfactants include fatty acid salts, alkyl sulfates, alkylbenzene sulfonates, alkylnaphthalene sulfonates, dialkyl sulfosuccinates, alkyl phosphates, naphthalene sulfonate formaldehyde condensates and polyoxyethylene alkyl sulfates.

Exemplary nonionic surfactants include polyoxyethylene alkyl ether, polyoxyethylene alkyl allyl ether, polyoxyethylene fatty acid ester, sorbitan fatty acid ester, polyoxyethylene sorbitan fatty acid ester, polyoxyethylene alkyklamine, glycerin fatty acid ester, and oxyethylene/oxypropylene block copolymers.

Other preferred examples include acetylene-based polyoxyethylene oxide surfactants (SURFYNOLS, trade name, available from AirProducts & Chemicals, Inc.) and amine oxide-based amphoteric surfactants such as N,N-dimethyl-N-alkylamine oxide.

Further, the surfactants described in pages 37 to 38 of JP-A No. 59-157636 and Research Disclosure No. 308119 (1989) are also applicable.

It is also suitable to improve abrasion resistance by using fluorine-based (fluorinated alkyl-based) surfactants, silicone-based surfactants and the like described in JP-A No. 2003-322926, JP-A No. 2004-325707 and JP-A No. 2004-309806.

These surface tension adjusters may be used also as a defoaming agent, and fluorine-based compounds, silicone-based compounds and chelate agents such as EDTA are also applicable.

The viscosity of the ink composition according to the invention is preferably from 1 to 30 mPa·s, more preferably from 1 to 20 mPa·s, further preferably from 2 to 15 mPa·s, particularly preferably from 2 to 10 mPa·s, from the viewpoint of jetting stability and coagulation rate when the application of ink is performed by an inkjet method.

When the application of ink is performed by a method other than the inkjet method, the viscosity of the ink composition is preferably from 1 to 40 mPa·s, more preferably from 5 to 20 mPa·s.

The viscosity of the ink composition can be measured by, for example, using a Brookfield viscometer.

[Maintenance Liquid]

The maintenance liquid that constitutes the ink set according to the invention includes at least an organic solvent and water, preferably a surfactant as well, and optionally other additives.

In the invention, the term "maintenance" refers to maintaining and sustaining the initial state or a state closer to the initial state of the recording head from which ink is jetted by an inkjet method and the jetting performance of the recording head, as well as cleaning the recording head in order to maintain the same to be in its favorable state.

—Organic Solvent—

The maintenance liquid according to the invention includes at least one kind of organic solvent. The organic solvent is not particularly limited, but is preferably a water-soluble organic solvent from the viewpoint that the cleaning property with respect to the aqueous ink composition is excellent, and that the addition of surfactant or the like is not necessary.

The organic solvent (hereinafter, simply referred to as "solvent" sometimes) may be selected as appropriate from the water-soluble organic solvents that can be used in the aqueous ink composition as mentioned above, and other organic solvents.

Among these, the maintenance liquid preferably includes the solvent having an SP value of 27.5 or less in an amount of 50% by mass or more, preferably 60% by mass or more, further preferably 70% by mass or more, particularly preferably 80% by mass or more, with respect to the total amount of the solvent.

When the maintenance liquid includes the solvent having an SP value of 27.5 or less in an amount of 50% by mass or more with respect to the total amount of the solvent, solubility of the ink adhering to an inkjet head in the form of a solid in the maintenance liquid can be increased, thereby improving the cleaning property.

The solubility parameter (SP value) of the solvent according to the invention is the value represented by a square root of molecular aggregation energy. The SP value can be calculated in accordance with the method described in R. F. Fedors, Polymer Engineering Science, 14, pp. 147-154 (1974), the descriptions thereof are incorporated here by reference, and the invention employs the value obtained by this method.

The following are specific examples of the compound suitably used as the solvent having an SP value of 27.5 or less and the SP value thereof (described in the parenthesis). However, the invention is not limited to these compounds.

diethylene glycol monoethyl ether (22.4)
diethylene glycol monobutyl ether (21.5)
triethylene glycol monobutyl ether (21.1)
dipropylene glycol monomethyl ether (21.3)
dipropylene glycol (27.2)

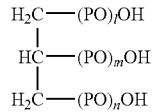 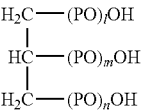 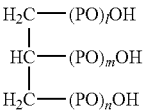

$1 + m + n = 3$ (26.4)  $1 + m + n = 4$ (24.9)  $1 + m + n = 5$ (23.9)
PO = propyleneoxy   PO = propyleneoxy   PO = propyleneoxy

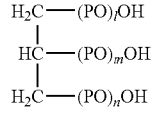 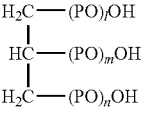

$1 + m + n = 6$ (23.2)  $1 + m + n = 7$ (22.6)
PO = propyleneoxy   PO = propyleneoxy $nC_4H_9O(AO)_4$—$H$ (AO=EO or PO, the ratio of EO:PO=1:1) (20.1)
$nC_4H_9O(AO)_{10}$—$H$ (AO=EO or PO, the ratio of EO:PO=1:1) (18.8)
$HO(A'O)_{40}$—$H$ (A'O=EO or PO, the ratio of EO:PO=1:3) (18.7)
$HO(A''O)_{55}$—$H$ (A''O=EO or PO, the ratio of EO:PO=5:6) (18.8)
$HO(PO)_3$—$H$ (24.7)
$HO(PO)_7$—$H$ (21.2)
1,2-hexanediol (27.4)

In the invention, EO and PO represent an ethyleneoxy group and a propyleneoxy group, respectively. The above compounds may be used alone or in combination of two or more kinds thereof.

In the invention, the ink composition preferably includes a solvent having an SP value of 27.5 or less with respect to the total amount of solvent, but from the viewpoint of improving solubility and swelling property of a solid that is formed from ink and that adheres to an inkjet head, the SP value is more preferably 24 or less, further preferably 22 or less.

The content of the organic solvent in the maintenance liquid is preferably from 1 to 50% by mass with respect to the total mass of the maintenance liquid. When the amount of the organic solvent is 1% by mass or more, favorable cleaning property of aqueous ink composition can be achieved, and when the amount of the organic solvent is 50% by mass or less, the cleaning property of the aqueous ink composition can be maintained at a high level.

Further, in a yet more preferred embodiment, 50% by mass or more of the organic solvent with respect to the total mass thereof is polyalkyleneoxyalkylether.

When the polyalkyleneoxyalkylether is included in the organic solvent in an amount of 50% by mass or more with respect to the total mass of the organic solvent, solubility of a solid that is formed from ink and that adheres to an inkjet head in the maintenance liquid can be increased, thereby improving the cleaning property.

Among the above, the content of polyalkyleneoxyalkylether with respect to the total mass of the organic solvent is preferably 60% by mass or more, more preferably 70% by mass or more, from the viewpoint of improving the solubility of a solid that is formed from ink and that adheres to an inkjet head. The upper limit of the solubility is not particularly limited.

The polyalkyleneoxyalkylether preferably has 1 to 4 carbon atoms in the alkylene site thereof, and 1 to 4 carbon atoms in the alkyl site thereof.

Specific examples of the polyalkyleneoxyalkylether include ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether.

—Surfactant—

The maintenance liquid according to the invention preferably includes a surfactant. Exemplary surfactants include anionic surfactants such as fatty acid salt, alkyl carboxylic acid salt, alkyl sulfuric acid ester salt, alkyl sulfonic acid salt, alkylbenzene sulfonic acid salt, alkylnaphthalene sulfonic acid salt, dialkyl sulfosuccinic acid salt, alkyl phosphoric acid ester salt, naphthalene sulfonic acid formaldehyde condensate and polyoxyethylene alkyl sulfuric acid ester salt; and nonionic surfactants such as polyoxyethylene alkyl ether, polyoxyethylene alkyl allyl ether, polyoxyethylene fatty acid ester, sorbitan fatty acid ester, polyoxyethylene sorbitan fatty acid ester, acetylene diol derivatives, polyoxyethylene alkylamine, glycerin fatty acid ester, and oxyethyelene/oxypropylene block copolymers.

Among the above, acetylene diol derivatives, sodium alkyl carboxylate and sodium alkyl sulfonate are more preferred, from the viewpoint that aggregation reaction with ink is not caused.

The content of the surfactant in the maintenance liquid is preferably from 0.5 to 10% by mass, more preferably from 1 to 3% by mass, with respect to the total mass of the maintenance liquid. When the content of the surfactant is within the above range, it is advantageous in view of the cleaning property.

—Water—

The maintenance liquid includes water, and the amount of water is not particularly limited. The amount of water is preferably from 50 to 99% by mass with respect to the total mass of the maintenance liquid.

—Other Additives—

The maintenance liquid may include other additives in addition to the above components, such as a discoloration inhibitor, an emulsification stabilizer, a penetration promotor, a UV absorber, an antiseptic agent, a fungicide, a pH adjuster, a surface tension adjuster (such as a nonionic surfactant, a cationic surfactant, an anionic surfactant or a betaine surfactant), a defoaming agent, and a viscosity adjuster.

—Properties of Maintenance Liquid—

The maintenance liquid according to the invention is preferably a liquid that does not cause coagulation when mixed with the ink composition according to the invention. The reason for this is that if coagulation is caused, components in the ink composition such as a pigment may further adhere to the inkjet head or the like, thereby reducing the effects of the invention.

The pH ($25\pm1°$ C.) of the maintenance liquid is preferably in the range of from 6 to 11, in view of the effects with respect to the coagulation of the ink composition. When the pH is 6 or higher, occurrence of coagulation of the ink composition in the vicinity of a head member such as a nozzle surface of the inkjet head can be avoided. When the pH is 11 or lower, it is effective to suppress the degradation of a liquid-repellent film of the head. The pH ($25\pm1°$ C.) of the maintenance liquid is preferably in the range of form 7 to 10. In this case, the pH ($25\pm1°$ C.) of the ink composition is preferably in the range of form 7.5 to 9.5 (more preferably from 8.0 to 9.0). In particular, from the viewpoint of improving the properties of the ink composition and improving the cleaning performance, it is preferable that the pH ($25\pm1°$ C.) of the ink composition is 7.5 or higher and the pH ($25\pm1°$ C.) of the maintenance liquid is from 6 to 11.

The viscosity at 20° C. of the maintenance liquid is preferably from 1 mPa·s to 1,000 mPa·s, more preferably from 1 mPa·s to less than 500 mPa·s, further preferably from 2 mPa·s to less than 100 mPa·s, from the viewpoint of handleability.

The method of measuring the viscosity according to the invention is similar to the measurement method described in the section concerning the reaction liquid.

The maintenance liquid according to the invention is preferably a colorless liquid that does not contain a pigment. The content of the solid component (25° C.) in the maintenance liquid is not particularly limited, but in view of preventing the solid component from remaining after the cleaning, it is preferably 5% by mass or less, more preferably 2% by mass or less.

[Reaction Liquid]

The ink set according to the invention preferably further includes at least one kind of reaction liquid that can form a coagulation upon contact with the ink composition (hereinafter, also referred to as "coagulation liquid").

The reaction liquid includes at least one kind of coagulation agent that can form a coagulation upon contact with the ink composition (hereinafter, also referred to as "coagulation promotor"). When the ink composition and the coagulation agent are mixed on a recording medium, coagulation of a pigment or the like being dispersed in the ink composition in a stable manner is promoted. The coagulation agent used in the invention is preferably at least one kind selected from a cationic polymer, an acidic compound or a polyvalent metal salt, from the viewpoint of the quality of the image to be formed.

As the cationic polymer, a polymer having a primary to tertiary amino group or a quaternary ammonium salt group as the cationic group is suitably used.

The cationic polymer is preferably a homopolymer of a monomer having a primary to tertiary amino group or a salt thereof or a quaternary ammonium salt group (cationic monomer), or a copolymer or a condensate obtained from the cationic monomer and a further monomer (hereinafter, also referred to as "non-cationic monomer"). The cationic polymer may be used either in the form of a water-soluble polymer or water-dispersible latex particles.

Specifically, the cationic polymer may be selected from poly(vinylpyridine)salt, polyalkylaminoethyl acrylate, polyalkylaminoethyl methacrylate, poly(vinylimidazole), polyethyleneimine, polybiguanide, polyguanide, a copolymer including an epihalohydrin derivative and an amine derivative, and a combination of these polymers.

The coagulation liquid used in the invention may further include an aqueous solvent (for example, water) in addition to the cationic polymer.

The content of the cationic polymer in the coagulation liquid with respect to the total mass of the coagulation liquid is preferably from 5 to 95% by mass, more preferably from 10 to 80% by mass, from the viewpoint of coagulation effects.

Examples of the coagulation liquid including an acidic compound include a liquid that can form a coagulation by changing the pH of the ink composition. At this time, the pH (25° C.) of the coagulation liquid is preferably from 1 to 6, more preferably from 2 to 5, further preferably from 3 to 5, from the viewpoint of coagulation rate of the ink composition. In this case, the pH (25° C.) of the ink composition used in the jetting process is preferably 7.5 or higher (more preferably 8 or higher).

In particular, in the invention, it is preferred that the pH (25° C.) of the ink composition is 7.5 or higher and the pH (25° C.) of the coagulation liquid is from 3 to 5, from the viewpoint of image density, resolution, and speeding up of inkjet recording.

The coagulation component may be used alone or in combination of two or more kinds The coagulation liquid may be formed using at least one kind of acidic compound as a coagulation promotor. As the acidic compound, compounds having a phosphoric acid group, a phosphonic acid group, a phosphinic acid group, a sulfate group, a sulfonic acid group, a sulfinic acid group or a carboxyl group, or a salt of these compounds (for example, a polyvalent metal salt) may be used. Among these, from the viewpoint of coagulation rate of the ink composition, compounds having a phosphoric acid group or a carboxyl group are more preferred, and compounds having a carboxyl group are further preferred.

The compound having a carboxyl group is preferably selected from polyacrylic acid, acetic acid, glycol acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumarin acid, thiophene carboxylic acid, nicotine acid, derivatives of these compounds, and salts of these compounds (for example, a polyvalent metal salt). These compounds may be used alone or in combination of two or more kinds.

The content of the acidic compound in the coagulation liquid with respect to the total mass of the coagulation liquid is preferably from 5 to 95% by mass, more preferably from 10 to 80% by mass, from the viewpoint of coagulation effects.

One preferred example of the coagulation liquid that improves the high-speed coagulation property is a coagulation liquid to which a polyvalent metal salt is added. Examples of the polyvalent metal salt include alkaline earth metals of Group 2 of the periodic table (for example, magnesium and calcium), transition metals of Group 3 of the periodic table (for example, lanthanum), cations of Group 13 of the periodic table (for example, aluminum) and lanthanides (for example, neodymium). Suitable metal salts include carboxylic metal salts (for example, salts of formic acid, acetic acid and benzoic acid), nitrate salt, chloride, and thiocyanate. Among these, a calcium salt or a magnesium salt of carboxylic acid (for example, salts of formic acid, acetic acid or benzoic acid), a calcium salt or a magnesium salt of nitric acid, calcium chloride, magnesium chloride, and a calcium salt or a magnesium salt of thiocyanate are preferred.

The content of the metal salt in the coagulation liquid is preferably from 1 to 10% by mass, more preferably from 1.5 to 7% by mass, further preferably from 2 to 6% by mass.

The viscosity of the coagulation liquid is preferably from 1 to 30 mPa·s, more preferably from 1 to 20 mPa·s, further preferably from 2 to 15 mPa·s, particularly preferably 2 to 10 mPa·s, from the viewpoint of coagulation rate of the ink composition. The viscosity is a value measured by using a viscometer (TV-22, trade name, available from Toki Sangyo Co., Ltd.) at a condition of 20° C.

The surface tension of the coagulation liquid is preferably from 20 to 60 mN/m, more preferably from 20 to 45 mN/m, further preferably from 25 to 40 mN/m, from the viewpoint of coagulation rate of the ink composition. The surface tension is a value measured by using an automatic surface tensiometer (CBVP-Z, trade name, available from Kyowa Interface Science, Co., Ltd.) at a condition of 25° C.

<Image Formation Method>

The image formation method according to the invention uses the ink set as mentioned above, and includes an ink application process in which the ink composition is applied to a recording medium, and a maintenance process in which a substance that is derived from the ink composition and that adheres to a head nozzle surface is removed with a maintenance liquid.

The image formation method according to the invention may include a further process, as necessary. Preferably, the image formation method includes a reaction liquid application process in which a reaction liquid, which fixes the ink composition upon contact with the ink composition by coagulating the components in the ink composition, is applied. Further, the image formation method may include a heat fixation process in which the ink image formed by applying the ink composition is heated and fixed, after the ink application process.

[Ink Application Process]

In the ink application process, ink is applied by jetting the ink composition used in the invention onto a recording medium by an inkjet recording method.

Any inkjet recording methods in which the ink composition is jetted from narrow nozzles in the form of droplets are included in the inkjet recording method according to the invention. The following are specific examples of the inkjet recording method in which the ink composition according to the invention may be used.

The first is a method referred to as an electrostatic suction method. The electrostatic suction method is a method of recording an image by applying a strong electric field between nozzles and accelerating electrodes disposed in front of the nozzles, jetting ink from the nozzles in the form of droplets in a continuous manner, jetting the ink droplets onto the recording medium by applying print information signals to deflection electrodes while the ink droplets are passing between the deflection electrodes, and fixing the ink droplets to the recording medium; or a method of recording an image by jetting ink droplets from nozzles onto a recording medium in accordance with print information signals without deflecting the ink droplets. The ink set according to the invention is also suitably used in this recording method employing an electostatic suction system.

The second is a method of forcibly jetting ink droplets from inkjet nozzles by applying pressure to an ink liquid using a small pump and mechanically oscillating the nozzles using a quartz oscillator or the like. The ink droplets jettingd from the nozzles are electrically charged at the same time, and an image is formed on a recording medium by jetting the ink droplets to the recording medium by applying print information signals to deflection electrodes while the ink droplets are passing between the deflection electrodes. The ink set according to the invention is also suitably used in this type of recording method.

The third is a method of recording an image on a recording medium by jetting ink droplets from nozzles onto the recording medium by applying pressure and print information signals to the ink liquid at the same time using piezoelectric elements (piezo method). The ink set according to the invention is also suitably used in this type of recording method.

The fourth is a method of recording an image on a recording medium by heating an ink liquid to form bubbles therein by using a micro electrode in accordance with print information signals, and jetting the ink liquid from nozzles onto the recording medium by allowing the bubbles to expand (bubble jet method, registered trade name). The ink set according to the invention is also suitably used in this type of recording method.

[Maintenance Process]

In the maintenance process, the maintenance liquid according to the invention is applied to a head member such as a nozzle surface of an inkjet head, thereby cleaning the ink composition that has adhered to the head member or the like and solidified. The application of the maintenance liquid may be performed by applying the maintenance liquid to the nozzle surface by coating the same by a coating method, or by jetting the same by an inkjet method. Details of the inkjet method are mentioned in the section concerning the ink application process. Details of the coating method are described later.

The maintenance using the maintenance liquid according to the invention may be performed by any method, as long as the ink that has solidified and adhered to a nozzle surface of an inkjet recording head can be removed by applying the maintenance liquid to a desired portion in order to prevent smudges or clogging due to the adhesion of ink. For example, the maintenance can be performed by applying the maintenance liquid to the nozzle surface of the recording head of the inkjet recording device, and then wiping the nozzle surface.

At this time, the application of the maintenance liquid can be performed by, for example, roller coating or spraying. Further, the process of removing the ink that has adhered to the nozzle surface (ink solid substance) is preferably performed by a method of wiping the nozzle surface using a wiper blade after the application of the maintenance liquid and scraping off the adhering substance of ink; a method of removing the ink with a wind pressure or a liquid pressure of the maintenance liquid or the like; and a method of wiping off the ink using a cloth or paper. Among these, a method of scraping off the ink with a blade or a method of wiping off the ink with a cloth or paper is preferred. The amount or the temperature of the maintenance liquid upon application thereof can be appropriately selected in accordance with the composition of the maintenance liquid, the type of the ink, or the amount of adhesion of the ink.

In the inkjet recording method, ink is jetted from nozzles having a diameter of as small as about 20 to 50 μm. Therefore, there is a fear that the viscosity of ink may be easily increased due to evaporation of a low-boiling solvent or water, or separation or coagulation of the colorant, and a precipitation may be easily formed. As a result, problems such as printing disorder and nozzle clogging may be caused. These problems tend to occur when the recording device is not used for a long period of time, and may be solved by using the maintenance liquid according to the invention that exhibits excellent cleaning properties of the ink.

The maintenance liquid according to the invention may be suitably used when performing cleaning after using the recording device for a long period of time, or prior to using the recording device that has not been used for a long period of time, as a method of solving the problems such as the increase in viscosity of the ink due to drying or solidification of the same.

When a reaction liquid is applied in the later-described reaction liquid application process by an inkjet method, the maintenance liquid according to the invention may be used for cleaning a head member of a nozzle surface or the like from which the reaction liquid is jetted. The cleaning of the head member of the nozzle surface or the like from which the reaction liquid is jetted may not be performed, or may be performed using a different solution from the maintenance liquid according to the invention.

[Heat Fixation Process]

The image formation method according to the invention may include a heat fixation process in which an ink image formed by applying the ink composition to the recording medium is fixed by heating, after the ink application process. By performing the heat fixation process, the image on the recording medium is fixed and whereby the abrasion resistance thereof is further improved.

In the invention, the heating process may be performed by either a drying process in which the heat source and the recording medium do not contact each other or a fixation process in which the heat source and the recording medium contact each other, or both of these processes may be performed.

The heating is preferably performed at a temperature of not lower than the glass transition temperature (Tg) of the polymer particles in the image. By heating the polymer particles at a temperature of not lower than the Tg thereof, the polymer particles form a film and the image is reinforced. The heating temperature is preferably within the range of Tg+10° C. or higher.

When pressure is applied during heating, the pressure is preferably within the range of from 0.1 to 3.0 MPa, more preferably from 0.1 to 1.0 MPa, from the viewpoint of smoothing the surface of the image.

The method of heating by itself is not particularly limited, and the heating may be performed by a non-contact method such as a method of heating using a heater such as a nichrome wire, a method of supplying warm air or hot air, or a method of heating using a halogen lamp or an infrared lamp.

The method of performing heating and fixation by contacting the image with a heated surface is not particularly limited, and suitable examples thereof include a method of pressing a hot plate against an image-recorded surface of the recording medium, a method of allowing the recording medium to pass between a pair of rollers that perform heating and pressure application or between a pair of belts that perform heating and pressure application, or through a device including a belt that is positioned at the side of image-recorded surface of the recording medium and performs heating and pressure application and a roller that is positioned on the other side of the recording medium and supports the recording medium. From the viewpoint of imparting glossiness, a heat roller is preferably used.

The roller that performs heating and pressure application may be a metal roller formed from a metal or a roller having a coating layer formed from an elastic material around a core formed from a metal, and optionally a surface layer (also referred to as a releasing layer) on the coating layer. The core may be a cylindrical member formed from iron, aluminum, SUS or the like, for example, and at least a portion of the surface of the core is preferably coated with the coating layer. In particular, the coating layer is preferably formed from a silicone resin or a fluorine resin having a releasing property. Further, one of the rollers that perform heating and pressure application preferably includes a heater inside the core. The heating and the pressure application may be performed at the same time by allowing the recording medium to pass between the rollers, and as necessary, the recording medium may be heated by nipping the same with two heated rollers. Suitable examples of the heater include a halogen lamp heater, a ceramic heater or a nichrome wire heater.

[Reaction Liquid Application Process]

The image formation method according to the invention may further include a reaction liquid application process in which a reaction liquid is applied to a recording medium. By performing the reaction liquid application process, coagulation of a pigment or the like dispersed in the ink composition in a stable manner can be promoted, thereby further improving the fixation of the image.

The application of the reaction liquid to the recording medium may be performed by any known method of applying a solution without being particularly limited. For example, the reaction liquid may be applied by an inkjet method, a coating method using a roller, or the like. It is also possible to apply the reaction liquid to a support during the preparation of a recording medium, and then produce a recording medium having the surface coated with the reaction liquid.

The application of the reaction liquid according to the invention may be a method of applying the reaction liquid in the form of an image to be recorded, or applying the reaction liquid as a layer on the recording medium.

The application amount of the reaction liquid is not particularly limited as long as coagulation of the ink composition can be caused, and may be appropriately selected according to the application method. For example, when the reaction liquid contains an acidic compound, the amount of the acidic compound is 0.3 g/m$^2$ or more, preferably from 0.3 to 2 g/m$^2$, more preferably from 0.5 to 1 g/m$^2$. The concentration or the application amount of the reaction liquid may be appropriately selected as long as the amount within the above range is applied by an inkjet method, a roller coating method, or the like.

In the invention, the image formation method preferably further includes an ink application process after the reaction liquid application process, and a drying-by-heating process in which the reaction liquid is dried by heating the same, prior to the application of the ink composition. By drying the reaction liquid by heating prior to the application of the ink, coloring properties of the ink such as prevention of bleeding can be improved, and a visual image having excellent color density and color hue can be formed. The drying by heating may be performed by using a known heating means or a blowing means employing blowing by a drier or the like, or a combination thereof. Examples of the heating method include a method of applying heat using a heater or the like to the opposite side of a recording medium to the side to which the reaction liquid is applied, a method of heating using an infrared heater, and a combination of these methods.

—Recording Medium—

In the image formation method according to the invention, an image is formed on a recording medium.

The recording medium is not particularly limited, but coated paper used in general offset printing or the like is preferred. In the image formation method according to the invention, a high-quality image can be recorded on coated paper having low ink absorbency in an effective manner.

The coated paper is obtained by forming a coating layer on the surface of bookpaper or neutralized paper, which is formed from cellulose as a main component and is typically not subjected to surface treatment, by applying a coating material. The coated paper may be a commercially available product. Specific examples thereof include coated papers (A2 and B2) such as "OK TOPCOAT+" (trade name, available from Oji Paper Co., Ltd.), "AURORACOAT" and "U LITE" (trade name, available from Nippon Paper Industries Co., Ltd.); and art paper (A1) such as "TOKUBISHI ART" (trade name, available from Mitsubishi Paper Mills Limited).

The following are exemplary embodiment according to the invention.

<1> An ink set comprising an ink composition and a maintenance liquid that removes from a head nozzle surface a substance that is derived from the ink composition and that adheres to the head nozzle surface, the ink composition comprising a pigment coated with a water-insoluble polymer formed by copolymerizing a monomer mixture comprising a styrene macromer; polymer particles; a water-soluble organic solvent; and water.

<2> The ink set according to <1>, further comprising a reaction liquid capable of forming a coagulation upon contact with the ink composition.

<3> The ink set according to <1> or <2>, wherein a glass transition temperature of the polymer particles is 80° C. or higher.

<4> The ink set according to any one of <1> to <3>, wherein a content of the polymer particles is greater than a content of the pigment.

<5> The ink set according to any one of <1> to <4>, wherein the polymer particles are self-dispersible polymer particles.

<6> The ink set according to any one of <1> to <5>, wherein the maintenance liquid comprises an organic solvent, at least 50% by mass of the organic solvent being a solvent having an SP value of 27.5 or less.

<7> The ink set according to any one of claim <1> to <6>, wherein at least 50% by mass of the water-soluble organic solvent is a solvent having an SP value of 27.5 or less.

<8> An image formation method that uses the ink set according to any one of <1> to <7>, the method comprising an ink application process in which the ink composition is applied to a recording medium, and a maintenance process in which the substance that is derived from the ink composition and that adheres to the head nozzle surface is removed from the head nozzle surface using the maintenance liquid.

<9> The image formation method according to <8>, further comprising a reaction liquid application process in which a reaction liquid is applied to the recording medium.

<10> The image formation method according to <9>, further comprising a heating process in which the recording medium to which the ink composition has been applied is heated.

<11> The image formation method according to <10>, wherein a glass transition temperature of the polymer particles in the ink composition is 80° C. or higher.

EXAMPLES

In the following, the invention is described in more detail with reference to the examples. However, the invention is not limited to these examples as long as the scope thereof does not exceed the idea of the invention. Unless otherwise specified, "parts" and "%" are mass-based.

The weight average molecular weight was measured by gel permeation chromatography (GPC). Unless otherwise specified, the GPC was performed by using a measurement device (HLC-8220GPC, trade name, available from Tosoh Corporation) with three columns connected in series (TSKGEL SUPER HZM-H, TSKGEL SUPER HZ4000, TSKGEL SUPER HZ2000, trade name, available from Tosoh Corporation) and THF (tetrahydrofuran) as an eluent, under the measurement conditions of sample concentration: 0.35% by mass, flow rate: 0.35 ml/min, sample injection amount: 10 µl, measurement temperature: 40° C., using an IR detector. The standard curve was produced from eight samples (standard samples TSK standard, polystyrene: F-40, F-20, F-4, F-1, A-5000, A-2500, A-1000, n-propylbenzene, trade name, available from Tosoh Corporation).

The surface tension was measured by using an automatic surface tensiometer (CBVP-Z, trade name, available from Kyowa Interface Science, Co., Ltd.) according to a Wilhelmy method using a platinum plate at 25° C. The viscosity was measured by using a viscometer (TV-22, trade name, available from Toki Sangyo Co., Ltd) at 30° C. The pH was measured by using a pH meter (WM-50EG, trade name, available from DKK-To a Corporation) at 25° C.±1° C.

Production Example 1

Synthesis and Preparation of Self-Dispersible Polymer Particles (Synthesis and Preparation of Self-Dispersible Polymer Particles A-01)

In a 2-liter three-neck flask equipped with a stirrer, a thermometer, a reflux condenser and a nitrogen gas introduction tube, 560.0 g of methyl ethyl ketone were placed and the surrounding temperature of the reaction container was increased to 87° C. While maintaining the refluxed state in the reaction container (refluxed until the reaction was completed), a mixed solution of 429.2 g of methyl methacrylate, 87.0 g of benzyl methacrylate, 29.0 g of PME-1000 (trade name, methoxypolyethylene glycol methacrylate (n=23), available from NOF Corporation), 34.8 g of methacrylic acid, 108.0 g of methyl ethyl ketone and 2.32 g of V-601 (trade name, available from Wako Pure Chemical Industries, Ltd.) was dropped therein at a constant rate so that the dropping was completed in 2 hours. After the completion of dropping, the mixture was stirred for 1 hour, and thereafter (1): a solution of 1.16 g of V-601 and 6.4 g of methyl ethyl ketone was further added and stirred for 2 hours. Subsequently, the process (1) was repeated 4 times, and a solution of 1.16 g of V-601 and 6.4 g of methyl ethyl ketone was further added and stirred for 3 hours. A resin solution of methyl methacrylate/benzyl methacrylate/PME-1000/methacrylic acid (=74/15/5/6 [mass ratio]) copolymer was thus obtained.

The obtained copolymer had a weight average molecular weight (Mw) of 63,000 (polystyrene-converted, calculated by gel permeation chromatography (GPC)), an acid value of 39 (mgKOH/g) and a glass transition temperature (Tg) of 102° C.

Subsequently, 291.5 g of the obtained resin solution (solid content concentration: 44.6%) were measured and 82.5 g of isopropanol and 50.82 g of NaOH aqueous solution (1 mol/L) were added thereto, and the temperature in the reaction container was increased to 87° C. Then, 364.0 g of distilled water were dropped therein at a rate of 10 ml/min, thereby allowing the mixture to form an aqueous dispersion. Thereafter, the temperature in the reaction container was maintained at 87° C. for 1 hour, at 91° C. for 1 hour, and at 95° C. for 30 minutes, under atmospheric pressure. The pressure inside the reaction container was reduced and a total amount of 309.4 g of isopropanol, methyl ethyl ketone and distilled water were distilled away, thereby obtaining an aqueous dispersion (emulsion) of self-dispersible polymer particles A-01 having a solid content concentration of 26.5%.

(Synthesis and Preparation of Self-Dispersible Polymer Particles A-04)

In a 2-liter three-neck flask equipped with a stirrer, a thermometer, a reflux condenser and a nitrogen gas introduction tube, 360.0 g of methyl ethyl ketone were placed and the temperature was increased to 75° C. While maintaining the temperature in the reaction container at 75° C., a mixed solution of 180.0 g of phenoxy ethyl acrylate, 162.0 g of methyl methacrylate, 18.0 g of acrylic acid, 72.0 g of methyl ethyl ketone and 1.44 g of V-601 (trade name, available from Wako Pure Chemical Industries, Ltd.) was dropped therein at a constant rate so that the dropping was completed in 2 hours. After the completion of dropping, a solution of 0.72 g of V-601 and 36.0 g of methyl ethyl ketone was further added and stirred at 75° C. for 2 hours. Then, a solution of 0.72 g of V-601 and 36.0 g of isopropanol was further added and stirred at 75° C. for 2 hours. Subsequently, the temperature was increased to 85° C. and the mixture was stirred for another 2 hours. A resin solution of phenoxy ethyl acrylate/methyl methacrylate/acrylic acid (=50/45/5[mass ratio]) copolymer was thus obtained.

The obtained copolymer had a weight average molecular weight (Mw) of 64,000 (polystyrene-converted, calculated by gel permeation chromatography (GPC)), an acid value of 38.9 (mgKOH/g) and a glass transition temperature (Tg) of 43° C.

Subsequently, 668.3 g of the obtained resin solution were measured and 388.3 g of isopropanol and 145.7 ml of NaOH aqueous solution (1 mol/L) were added thereto, and the temperature in the reaction container was increased to 80° C. Then, 720.1 g of distilled water were dropped therein at a rate of 20 ml/min, thereby allowing the mixture to form an aqueous dispersion. Thereafter, the temperature in the reaction container was maintained at 80° C. for 2 hours, at 85° C. for 2 hours, and at 90° C. for 2 hours, under atmospheric pressure. Then, the pressure inside the reaction container was reduced and a total amount of 913.7 g of isopropanol, methyl ethyl ketone and distilled water were distilled away, thereby obtaining an aqueous dispersion (emulsion) of self-dispersible polymer particles A-04 having a solid content concentration of 28.0%.

(Synthesis and Preparation of Self-Dispersible Polymer Particles A-05)

In a 2-liter three-neck flask equipped with a stirrer, a thermometer, a reflux condenser and a nitrogen gas introduction tube, 360.0 g of methyl ethyl ketone were placed and the temperature was increased to 75° C. A mixed solution of 180.0 g of methyl methacrylate, 32.4 g of methoxy ethyl acrylate, 126.0 g of benzyl acrylate, 21.6 g of methacrylic acid, 72.0 g of methyl ethyl ketone and 1.44 g of V-601 (trade name, available from Wako Pure Chemical Industries, Ltd.) was dropped therein at a constant rate so that the dropping was completed in 2 hours. After the completion of dropping, a solution of 0.72 g of V-601 and 36.0 g of methyl ethyl ketone was further added and stirred at 75° C. for 2 hours. Then, a solution of 0.72 g of V-601 and 36.0 g of methyl ethyl ketone was further added and stirred at 75° C. for 2 hours. Subsequently, the temperature was increased to 85° C. and the mixture was stirred for another 2 hours. A resin solution of methyl methacrylate/methoxy ethyl acrylate/benzyl methacrylate/methacrylic acid (=50/9/35/6[mass ratio]) copolymer was thus obtained.

The obtained copolymer had a weight average molecular weight (Mw) of 66,000 (polystyrene-converted, calculated by gel permeation chromatography (GPC)), an acid value of 39 (mgKOH/g) and a glass transition temperature (Tg) of 78° C.

Subsequently, 668.3 g of the obtained resin solution were measured and 388.3 g of isopropanol and 145.7 ml of NaOH aqueous solution (1 mol/L) were added thereto, and the temperature in the reaction container was increased to 80° C. Then, 720.1 g of distilled water were dropped therein at a rate of 20 ml/min, thereby allowing the mixture to form an aqueous dispersion. Thereafter, the temperature in the reaction container was maintained at 80° C. for 2 hours, at 85° C. for 2 hours, and at 90° C. for 2 hours, under atmospheric pressure. Then, the pressure inside the reaction container was reduced and a total amount of 913.7 g of isopropanol, methyl ethyl ketone and distilled water were distilled away, thereby obtaining an aqueous dispersion (emulsion) of self-dispersible polymer particles A-05 having a solid content concentration of 28.0%.

(Synthesis and Preparation of Self-Dispersible Polymer Particles A-07)

In a 2-liter three-neck flask equipped with a stirrer, a thermometer, a reflux condenser and a nitrogen gas introduction tube, 360.0 g of methyl ethyl ketone were placed and the temperature was increased to 75° C. A mixed solution of 162.0 g of methyl methacrylate, 126.0 g of isobornyl methacrylate, 50.4 g of PME-100 (trade name, methoxypolyethylene glycol methacrylate (n=2), available from NOF Corporation), 21.6 g of methacrylic acid, 72.0 g of methyl ethyl ketone and 1.44 g of V-601 (trade name, available from Wako Pure Chemical Industries, Ltd.) was dropped therein at a constant rate so that the dropping was completed in 2 hours. After the completion of dropping, a solution of 0.72 g of V-601 and 36.0 g of methyl ethyl ketone was further added and stirred at 75° C. for 2 hours. Then, a solution of 0.72 g of V-601 and 36.0 g of methyl ethyl ketone was further added and stirred at 75° C. for 2 hours. Subsequently, the temperature was increased to 85° C. and the mixture was stirred for another 2 hours. A resin solution of methyl methacrylate/isobornyl methacrylate/PME-100/methacrylic acid (=45/35/14/6[mass ratio]) copolymer was thus obtained.

The obtained copolymer had a weight average molecular weight (Mw) of 65,000 (polystyrene-converted, calculated by gel permeation chromatography (GPC)), an acid value of 39 (mgKOH/g) and a glass transition temperature (Tg) of 92° C.

Subsequently, 668.3 g of the obtained resin solution were measured and 388.3 g of isopropanol and 145.7 ml of NaOH aqueous solution (1 mol/L) were added thereto, and the temperature in the reaction container was increased to 80° C. Then, 720.1 g of distilled water were dropped therein at a rate of 20 ml/min, thereby allowing the mixture to form an aqueous dispersion. Thereafter, the temperature in the reaction container was maintained at 80° C. for 2 hours, at 85° C. for 2 hours, and at 90° C. for 2 hours, under atmospheric pressure. Then, the pressure inside the reaction container was reduced and a total amount of 913.7 g of isopropanol, methyl ethyl ketone and distilled water were distilled away, thereby obtaining an aqueous dispersion (emulsion) of self-dispersible polymer particles A-07 having a solid content concentration of 28.0%.

Production Example 2

Preparation of Pigment Dispersion (Preparation of Water-Insoluble Polymer Dispersant)

In a reaction container, 20 parts of acetone, 20 parts of styrene, 4 parts of methacrylic acid, 10 parts of butoxypolyethylene glycol (9) methacrylate, 5 parts of silicone macromer, 5 parts of styrene macromer B, 0.3 parts of n-dodecylmercaptan and a polymerization chain transfer agent were placed, and the reaction container was thoroughly subjected to nitrogen-substitution.

On the other hand, 25 parts of styrene, 4 parts of methacrylic acid, 15 parts of butoxypolyethylene glycol (9) methacrylate, 5 parts of silicone macromer, 5 parts of styrene macromer B, 1.7 parts of n-dodecylmercaptan and a polymerization chain transfer agent, 60 parts of acetone and 1.2 parts of 2,2'-azobis(2,4-dimethylvaleronitrile) were placed in a dropping funnel, and the dropping funnel was thoroughly subjected to nitrogen-substitution. Under a nitrogen atmosphere, the mixed solution in the reaction container was stirred and the temperature thereof was increased to 65° C., and the mixed solution in the dropping funnel was gradually dropped in the reaction container over 3 hours. After 2 hours from the completion of dropping, a solution prepared by dissolving 0.3 parts of 2,2'-azobis(2,4-dimethylvaleronitrile) in 5 parts of acetone was added, and the mixture was further subjected to aging at 65° C. for 2 hours and at 70° C. for 2 hours, thereby obtaining a copolymer solution of water-insoluble polymer dispersant.

Part of the obtained copolymer solution was dried at 105° C. for 2 hours under reduced pressure, and the copolymer was isolated by removing the solvent. The mass average molecular weight of the copolymer as measured by gel permeation chromatography using polystyrene as the standard substance and dodexyldimethylamine-containing chloroform (1 mmol/L) as the solvent was 38,000.

5 parts of the copolymer obtained by drying the copolymer solution under reduced pressure were dissolved in 25 parts of acetone, and a predetermined amount of ammonia (30% aqueous solution) were added thereto to neutralize a part of the copolymer.

Details of the components described above are as follows.

Silicone macromer: FM-0711, trade name, available from Chisso Corporation, number average molecular weight: 1,000, represented by Formula (II-1a)

Styrene macromer B: AS-6, trade name, available from Toagosei Co., Ltd, styrene homopolymerized macromer, number average molecular weight: 6,000, polymerizable functional group: methacryloyloxy group (Preparation of Cyan Dispersion C)

5.0 g in terms of solid content concentration of the solution of the water-insoluble polymer dispersant obtained in the above process, 10.0 g of cyan pigment (Pigment Blue 15:3, trade name, available from Dainichiseika Color & Chemicals Mfg. Co., Ltd.), 40.0 g of methyl ethyl ketone, 8.0 g of sodium hydroxide (1 mol/L), 82.0 g of ion exchange water and 300 g of zirconia beads (0.1 mm) were supplied in a vessel, and the mixture was dispersed using a ready mill disperser (available from IMEX Co., Ltd.) at 1,000 rpm for 6 hours. The obtained pigment dispersion was condensed under reduced pressure using an evaporator until the methyl ethyl ketone was sufficiently distilled away and the pigment concentration was about 12%.

Thereafter, the pigment dispersion was subjected to centrifugal treatment at 8,000 rpm for 30 minutes, and coarse particles that remained as a precipitation were removed therefrom. The absorbency of the supernatant was measured and the pigment concentration was determined.

The cyan dispersion as a colorant was thus prepared. The average particle diameter was 97 nm and the temporal particle diameter was 99 nm.

(Preparation of Magenta Dispersion M)

Magenta dispersion M was prepared in a similar manner to cyan dispersion C, except that a magenta pigment (Pigment Red 122) was used instead of a cyan pigment (Pigment Blue 15:3). The average particle diameter of the obtained magenta dispersion M was 92 nm and the temporal particle diameter was 95 nm.

(Preparation of Black Dispersion K)

Black dispersion K was prepared in a similar manner to cyan dispersion C, except that carbon black (NIPEX 160-IQ, trade name, available from Evonik Degussa Japan Co., Ltd.) was used instead of the cyan pigment (Pigment Blue 15:3) and that the addition amount of the water-insoluble polymer dispersant was changed to 3.0 g in terms of solid content. The average particle diameter of the obtained black dispersion K was 95 nm and the temporal particle diameter was 95 nm.

Production Example 3

Preparation of Ink

Aqueous inks were prepared by using the pigment dispersions obtained above (cyan dispersion C, magenta dispersion M and black dispersion K) and the dispersion of self-dispersible polymer particles, by mixing the following components of the ink composition of each color. The obtained aqueous ink was charged in a plastic disposable syringe, and was filtered using a filter made of polyvinylidene fluoride (PVDF) having a pore size of 5 μm (MILLEX-SV, trade name, diameter: 25 mm), thereby preparing the finished ink.

(Ink Composition 1)

| (Ink Composition 1) | |
|---|---|
| Cyan pigment (Pigment Blue 15:3) | 2.5% |
| Water-insoluble polymer dispersant (solid content) | 1.25% |
| Aqueous dispersion of self-dispersible polymer particles A-01 (solid content) | 8.0% |

-continued

| (Ink Composition 1) | |
|---|---|
| SANNIX GP250 (SP value: 26.4, water-soluble organic solvent, available from Sanyo Chemical Industries, Ltd.) | 8.0% |
| Tripropylene glycol monomethyl ether (SP value: 20.4, TPGmME, water-soluble organic solvent, available from Wako Pure Chemical Industries, Ltd.) | 8.0% |
| OLFINE E1010 (surfactant, available from Nission Chemical Industry Co., Ltd.) | 1.0% |
| Ion exchange water | 71.25% |

The pH of the ink composition (undiluted solution) was set at 8.3.

(Ink Composition 2)

| (Ink Composition 2) | |
|---|---|
| Cyan pigment (Pigment Blue 15:3) | 2.5% |
| Water-insoluble polymer dispersant (solid content) | 1.25% |
| Aqueous dispersion of self-dispersible polymer particles A-01 (solid content) | 2.0% |
| SANNIX GP250 (SP value: 26.4, water-soluble organic solvent, available from Sanyo Chemical Industries, Ltd.) | 8.0% |
| Tripropylene glycol monomethyl ether (SP value: 20.4, TPGmME, water-soluble organic solvent, available from Wako Pure Chemical Industries, Ltd.) | 8.0% |
| OLFINE E1010 (surfactant, available from Nission Chemical Industry Co., Ltd.) | 1.0% |
| Ion exchange water | 77.25% |

The pH of the ink composition (undiluted solution) was set at 8.3.

(Ink Composition 3)

| (Ink Composition 3) | |
|---|---|
| Cyan pigment (Pigment Blue 15:3) | 2.5% |
| Water-insoluble polymer dispersant (solid content) | 1.25% |
| Aqueous dispersion of self-dispersible polymer particles A-07 (solid content) | 8.0% |
| SANNIX GP250 (SP value: 26.4, water-soluble organic solvent, available from Sanyo Chemical Industries, Ltd.) | 8.0% |
| Tripropylene glycol monomethyl ether (SP value: 20.4, TPGmME, water-soluble organic solvent, available from Wako Pure Chemical Industries, Ltd.) | 8.0% |
| OLFINE E1010 (surfactant, available from Nission Chemical Industry Co., Ltd.) | 1.0% |
| Ion exchange water | 71.25% |

The pH of the ink composition (undiluted solution) was set at 8.3.

(Ink Composition 4)

| (Ink Composition 4) | |
|---|---|
| Cyan pigment (Pigment Blue 15:3) | 2.5% |
| Water-insoluble polymer dispersant (solid content) | 1.25% |
| Aqueous dispersion of self-dispersible polymer particles A-05 (solid content) | 8.0% |
| SANNIX GP250 (SP value: 26.4, water-soluble organic solvent, available from Sanyo Chemical Industries, Ltd.) | 8.0% |
| Tripropylene glycol monomethyl ether (SP value: 20.4, TPGmME, water-soluble organic solvent, available from Wako Pure Chemical Industries, Ltd.) | 8.0% |
| OLFINE E1010 (surfactant, available from Nission Chemical Industry Co., Ltd.) | 1.0% |
| Ion exchange water | 71.25% |

The pH of the ink composition (undiluted solution) was set at 8.3.

(Ink Composition 5)

| (Ink Composition 5) | |
|---|---|
| Magenta pigment (Pigment Red 122) | 5.0% |
| Water-insoluble polymer dispersant (solid content) | 2.5% |
| Aqueous dispersion of self-dispersible polymer particles A-01 (solid content) | 6.5% |
| Glycerin (SP value: 41.0, water-soluble organic solvent, available from Wako Pure Chemical Industries, Ltd) | 10.0% |
| Diethylene glycol (SP value: 30.6, DEG, water-soluble organic solvent, available from Wako Pure Chemical Industries, Ltd.) | 10.0% |
| OLFINE E1010 (surfactant, available from Nission Chemical Industry Co., Ltd.) | 1.0% |
| Ion exchange water | 65.0% |

The pH of the ink composition (undiluted solution) was set at 8.3.

(Ink Composition 6)

| (Ink Composition 6) | |
|---|---|
| Magenta pigment (Pigment Red 122) | 5.0% |
| Water-insoluble polymer dispersant (solid content) | 2.5% |
| Glycerin (SP value: 41.0, water-soluble organic solvent, available from Wako Pure Chemical Industries, Ltd) | 10.0% |
| Diethylene glycol (SP value: 30.6, DEG, water-soluble organic solvent, available from Wako Pure Chemical Industries, Ltd.) | 10.0% |
| OLFINE E1010 (surfactant, available from Nission Chemical Industry Co., Ltd.) | 1.0% |
| Ion exchange water | 71.5% |

The pH of the ink composition (undiluted solution) was set at 8.3.

(Ink Composition 7)

| (Ink Composition 7) | |
|---|---|
| Black pigment (carbon black) | 4.0% |
| Water-insoluble polymer dispersant (solid content) | 1.2% |
| Aqueous dispersion of self-dispersible polymer particles A-04 (solid content) | 5.0% |
| SANNIX GP250 (SP value: 26.4, water-soluble organic solvent, available from Sanyo Chemical Industries, Ltd.) | 10.0% |
| Diethylene glycol monoethyl ether (SP value: 22.4, DEGmEE, water-soluble organic solvent, available from Wako Pure Chemical Industries, Ltd.) | 5.0% |
| OLFINE E1010 (surfactant, available from Nission Chemical Industry Co., Ltd.) | 1.0% |
| Ion exchange water | 73.8% |

The pH of the ink composition (undiluted solution) was set at 8.3.

(Ink Composition 8)

| (Ink Composition 8) | |
|---|---|
| Black pigment (carbon black) | 4.0% |
| Water-insoluble polymer dispersant (solid content) | 1.2% |
| Aqueous dispersion of self-dispersible polymer particles A-04 (solid content) | 5.0% |
| SANNIX GP250 (SP value: 26.4, water-soluble organic solvent, available from Sanyo Chemical Industries, Ltd.) | 15.0% |
| Tripropylene glycol monomethyl ether (SP value: 20.4, TPGmME, water-soluble organic solvent, available from | 10.0% |

(Ink Composition 8)

| | |
|---|---|
| Wako Pure Chemical Industries, Ltd.) | |
| OLFINE E1010 (surfactant, available from Nission Chemical Industry Co., Ltd.) | 1.0% |
| Ion exchange water | 63.8% |

The pH of the ink composition (undiluted solution) was set at 8.3.

Production Example 4

Preparation of Maintenance Liquid (Preparation of Maintenance Liquid 1)
Maintenance liquid 1 was prepared by mixing the following components.

| (Production Example 4) -Preparation of maintenance liquid- (Preparation of Maintenance Liquid 1) Maintenance liquid 1 was prepared by mixing the following components. | |
|---|---|
| Diethylene glycol monobutyl ether (SP value: 21.5, DEGmBE, solvent, available from Wako Pure Chemical Industries, Ltd.) | 25.0% |
| Sodium oleate (surfactant, available from Wako Pure Chemical Industries, Ltd.) | 1.0% |
| Ion exchange water | 74.0% |

(Preparation of Maintenance Liquid 2)
Maintenance liquid 2 was prepared by mixing the following components.

| (Preparation of Maintenance Liquid 2) Maintenance liquid 2 was prepared by mixing the following components. | |
|---|---|
| Tripropylene glycol monomethyl ether (SP value: 20.4, TPGmME, solvent, available from Wako Pure Chemical Industries, Ltd.) | 20.0% |
| Sodium oleate (surfactant, available from Wako Pure Chemical Industries, Ltd.) | 1.0% |
| Ion exchange water | 79.0% |

(Preparation of Maintenance Liquid 3)
Maintenance liquid 3 was prepared by mixing the following components.

| (Preparation of Maintenance Liquid 3) Maintenance liquid 3 was prepared by mixing the following components. | |
|---|---|
| Glycerin (SP value: 41.0, solvent, available from Wako Pure Chemical Industries, Ltd.) | 20.0% |
| Sodium oleate (surfactant, available from Wako Pure Chemical Industries, Ltd.) | 1.0% |
| Ion exchange water | 79.0% |

Production Example 5

(Preparation of Reaction liquid 1)
Reaction liquid 1 was prepared by mixing the following components.

| (Production Example 5) (Preparation of Reaction liquid 1) Reaction liquid 1 was prepared by mixing the following components. | |
|---|---|
| Citric acid (available from Wako Pure Chemical Industries, Ltd.) | 16.7% |
| Diethylene glycol monomethyl ether (available from Wako Pure Chemical Industries, Ltd.) | 20.0% |
| ZONYL FSN-100 (available from Du Pont Kabushiki Kaisha) | 1.0% |
| Ion exchange water | 62.3% |

(Preparation of Reaction liquid 2)
Reaction liquid 2 was prepared by mixing the following components.

| (Preparation of Reaction liquid 2) Reaction liquid 2 was prepared by mixing the following components. | |
|---|---|
| Malonic acid (divalent carboxylic acid, available from Wako Pure Chemical Industries, Ltd.) | 25.0% |
| SANNIX GP250 (hydrophilic organic solvent, available from Sanyo Chemical Industries, Ltd.) | 20.0% |
| Sodium N-oleoyl-N-methyl taurate (surfactant) | 1.0% |
| Ion exchange water | 54.0% |

(Preparation of Reaction liquid 3)
Reaction liquid 3 was prepared by mixing the following components.

| (Preparation of Reaction liquid 3) Reaction liquid 3 was prepared by mixing the following components. | |
|---|---|
| Calcium chloride | 10.0% |
| SANNIX GP250 (hydrophilic organic solvent, available from Sanyo Chemical Industries, Ltd.) | 15.0% |
| OLFINE E1010 (surfactant, available from Nission Chemical Industry Co., Ltd.) | 1.0% |
| Ion exchange water | 74.0% |

(Preparation of Reaction liquid 4)
Reaction liquid 4 was prepared by mixing the following components.

| (Preparation of Reaction liquid 4) Reaction liquid 4 was prepared by mixing the following components. | |
|---|---|
| Dimethylamine/epichlorohydrin copolymer (polymerization ratio = 1:1, weight average molecular weight: 6,000) | 5.0% |
| Diethylene glycol monoethyl ether (available from Wako Pure Chemical Industries, Ltd.) | 20.0% |
| ZONYL FSN-100 (available from Du Pont Kabushiki Kaisha) | 1.0% |
| Ion exchange water | 74.0% |

Example 1

The ink set according to the invention was prepared by combining ink composition 1, maintenance liquid 1 and reaction liquid 1.

A recording medium (TOKUBISHI ART double-faced N, 84.9 g/m$^2$, available from Mitsubishi Paper Mills Limited.) was fixed on a stage that was movable in a predetermined straight-line direction at a rate of 500 mm/second, and the reaction liquid was applied on the recording medium to a thickness of about 5 μm using a wire bar coater, and the reaction liquid was dried at 50° C. for 2 seconds immediately after the application.

An inkjet printer produced by modifying GELJET GX5000 (trade name, available from Ricoh Company, Ltd.) was used as the inkjet recording device, and a solid image was formed by jetting the ink composition at a jetting amount of 3.5 pL and an ink application amount of 5 g/m² for 60 minutes in a continuous manner, and thereafter the jetting was stopped for 10 minutes.

After the stoppage, the maintenance liquid was applied to the nozzle surface of the inkjet head using a roller, and was wiped away using a wiper blade (hydrogenated NBR). Thereafter, a further solid image was formed by jetting the ink composition in a consecutive manner for 60 minutes.

Subsequently, the recording medium to which the ink had been applied was dried under the following conditions.

Drying method: air drying
Wind speed: 15 m/s
Temperature: heated with a contact-type planar heater from the side of the recording medium opposite to the recorded side (back side) so that the surface temperature at the recorded side of the recording medium was 60° C.
Air blowing area: 640 mm (drying time: 1 second)

Then, a heat fixation treatment was performed by passing the recording medium between a pair of rollers under the following conditions.

Silicone rubber rollers (hardness: 50°, nip width: 5 mm)
Roller temperature: 75° C.
Pressure: 0.8 MPa The printed material obtained in the above process is referred to as an evaluation sample. Evaluation was conducted using the evaluation sample or by producing a further printed material as appropriate. The evaluation results are shown in the following Table 1.

[High-Speed Printing Suitability]

The high-speed printing suitability was evaluated by calculating the rate of occurrence of irregularity (number of printed materials with irregularity/total number of printed materials).

In this evaluation, the printed area of the evaluation sample was equally divided into 9 regions (3 in width and 3 in length), and the color at the central portion of each of the 9 regions was measured using a colorimeter (SPECTROEYE, trade name, manufactured by X-Rite), and when the deviation from the average value in color hue (3σ) was 3 or higher in terms of ΔE, it was determined that irregularity occurred.

Evaluation Criteria
A: Ratio of occurrence of irregularity is less than 0.5%
B: Ratio of occurrence of irregularity is from 0.5% to less than 1%
C: Ratio of occurrence of irregularity is from 1% to less than 5%
D: Ratio of occurrence of irregularity is 5% or higher

[Long-Term Jetting Reliability]

After repeating the aforementioned process of 60-minute consecutive jetting, 10-minute stoppage and wiping 5 times, a parallel line pattern of line images of 75×2400 dpi was formed by using 96 nozzles of the inkjet printer used in the above process, at a jetting frequency of 12 kHz. The position of central portion of width of each line was measured with a dot analyzer (DA-6000, trade name, manufactured by Oji Scientific Instruments) and the standard deviation σ of a difference between the theoretical position of the central portion and the actually measured position of the central portion was calculated.

Evaluation Criteria
A: σ<2 μm
B: 2 μm≤σ<3 μm
C: 3 μm≤σ<6 μm
D: 6 μm≤σ

[Abrasion Resistance]

A non-printed sheet of Tokubishi Art, cut in the size of 10 mm×50 mm, was wound around a paperweight (weight: 470 g, size: 15 mm×30 mm×120 mm), and the evaluation sample was rubbed with it in a back-and-forth manner for 3 times (load: equivalent of 260 kg/m², contact area of non-printed Tokubishi Art and evaluation sample: 150 mm²). After the rubbing, the printed surface was observed with naked eye and evaluated in accordance with the following evaluation criteria.

Evaluation Criteria
A: Peeling of the image (colorant) in the printed surface was not observed at all (no peeling of the printed material was observed and coloration of the non-printed paper did not occur).
B: Peeling of the image (colorant) in the printed surface was almost not observed (no peeling of the printed material was observed but the non-printed paper was slightly colored).
C: Peeling of the image (colorant) in the printed surface was observed in some portions (peeling was observed in not more than 5% of the rubbed region of the printed material).
D: Peeling of the image (colorant) in the printed surface was observed in the entire region (peeling was observed in more than 5% of the rubbed region of the printed material).

[Harftone Glossiness]

An image having a discharge area ratio of 30% and an image having a discharge area ratio of 100% were printed and the glossiness of each image was measured with a portable glossiness checker (IG-331, trade name, available from Horiba, Ltd.) at a value of 60°, and the ratio of glossiness (glossiness at 30% printed area)/(glossiness at 100% printed area) was calculated.

Evaluation Criteria
A: The ratio of glossiness was 50% or higher
B: The ratio of glossiness was from 45% to less than 50%
C: The ratio of glossiness was from 40% to less than 45%
D: The ratio of glossiness was less than 40%

[Offset Resistance]

After performing the heat fixation treatment, smudges on the surface of the evaluation sample and the silicone rubber roller were observed with naked eye, and were evaluated in accordance with the following evaluation criteria.

Evaluation Criteria
A: No offset was observed.
B: A slight degree of offset was observed in some portions, but was a tolerable level for practical applications.
C: Offset was observed and was allowable limit of tolerable level for practical applications.
D: A significant degree of offset was observed and was not tolerable for practical applications.

Example 2

The ink set according to the invention was prepared by combining ink composition 5, maintenance liquid 2 and reaction liquid 2. Using this ink set, an image was formed in a similar manner to Example 1 and evaluation was conducted in a similar manner to Example 1. The evaluation results are shown in the following Table 1.

Example 3

The ink set according to the invention was prepared by combining ink composition 7, maintenance liquid 1 and reaction liquid 3. Using this ink set, an image was formed in a similar manner to Example 1 and evaluation was conducted in a similar manner to Example 1. The evaluation results are shown in the following Table 1.

Example 4

The ink set according to the invention was prepared by combining ink composition 2, maintenance liquid 1 and reaction liquid 1. Using this ink set, an image was formed in a similar manner to Example 1 and evaluation was conducted in a similar manner to Example 1. The evaluation results are shown in the following Table 1.

Example 5

The ink set according to the invention was prepared by combining ink composition 1, maintenance liquid 3 and reaction liquid 4. Using this ink set, an image was formed in a similar manner to Example 1 and evaluation was conducted in a similar manner to Example 1. The evaluation results are shown in the following Table 1.

Example 6

The ink set according to the invention was prepared by combining ink composition 3, maintenance liquid 1 and reaction liquid 1. Using this ink set, an image was formed in a similar manner to Example 1 and evaluation was conducted in a similar manner to Example 1. The evaluation results are shown in the following Table 1.

Example 7

The ink set according to the invention was prepared by combining ink composition 4, maintenance liquid 1 and reaction liquid 1. Using this ink set, an image was formed in a similar manner to Example 1 and evaluation was conducted in a similar manner to Example 1. The evaluation results are shown in the following Table 1.

Comparative Example 1

The recording medium of the same kind as that used in Example 1 was fixed on a stage that was movable in a predetermined straight-line direction at a rate of 500 mm/second.

Using the same inkjet recording apparatus as that used in Example 1, a solid image was formed by jetting ink composition 6 at a jetting amount of 3.5 pL and an ink application amount of 5 g/m² for 60 minutes in a consecutive manner, and thereafter the jetting was stopped for 10 minutes. After the stoppage, a further solid image was formed by jetting ink composition 6 in a consecutive manner for 60 minutes. The solid image was air-dried under similar conditions to that of Example 1. The evaluation results are shown in the following Table 1. In Comparative Example 1, evaluation of offset resistance was not conducted.

Comparative Example 2

An ink set was prepared using ink composition 8 and reaction liquid 3.

The recording medium of the same kind as that used in Example 1 was fixed on a stage that was movable in a predetermined straight-line direction at a rate of 500 mm/second. The reaction liquid was applied onto the recording medium to a thickness of about 5 μm with a wire bar coater, and was dried at 50° C. for 2 seconds immediately after the application.

Using the same inkjet recording apparatus as that used in Example 1, a solid image was formed by jetting the ink composition at a jetting amount of 3.5 pL and an ink application amount of 5 g/m² for 60 minutes in a consecutive manner, and thereafter the jetting was stopped for 10 minutes. After the stoppage, a further solid image was formed by jetting the ink composition in a consecutive manner for 60 minutes. The solid image was air-dried under similar conditions to that of Example 1, and was subsequently subjected to a heat fixation treatment.

The evaluation sample was evaluated in the same manner as Example 1, and the evaluation results are shown in the following Table 1.

TABLE 1

| | | Ink set | | | | | | | |
|---|---|---|---|---|---|---|---|---|---|
| | | Ink composition | | | | | | | |
| | | Pigment | | Solvent | | Polymer particles | | Solvent in Maintenance liquid | Coagulation agent in Reaction solution |
| | | Type | Amount | Type and Amount | | Tg (°C.) | Amount | | |
| Example 1 | Composition 1 | C | 2.5% | GP250 8% | TPGmME 8% | 102 | 8.0% | DEGmBE | citric acid |
| Example 2 | Composition 5 | M | 5.0% | glycerin 10% | DEG 10% | 102 | 6.5% | TPGmME | malonic acid |
| Example 3 | Composition 7 | K | 4.0% | GP250 10% | DEGmEE 5% | 43 | 5.0% | DEGmBE | CaCl$_2$ |
| Example 4 | Composition 2 | C | 2.5% | GP250 8% | TPGmME 8% | 102 | 2.0% | DEGmBE | citric acid |
| Example 5 | Composition 1 | C | 2.5% | GP250 8% | TPGmME 8% | 102 | 8.0% | glycerin | polylallyl amine |
| Example 6 | Composition 3 | C | 2.5% | GP250 8% | TPGmME 8% | 92 | 8.0% | DEGmBE | citric acid |
| Example 7 | Composition 4 | C | 2.5% | GP250 8% | TPGmME 8% | 78 | 8.0% | DEGmBE | citric acid |
| Com. Ex. 1 | Composition 6 | M | 5.0% | glycerin 10% | DEG 10% | — | — | — | — |

TABLE 1-continued

| | | | | | | | | | | |
|---|---|---|---|---|---|---|---|---|---|---|
| Com. Ex. 2 | Composition 8 | K | 4.0% | GP250 15% | TPGmME 10% | 43 | 5.0% | — | | CaCl$_2$ |

| | Evaluation results | | | | |
|---|---|---|---|---|---|
| | High-speed printing suitability | Long-term jetting reliability | Abrasion resistance | Halftone glossiness | Offset resistance |
| Example 1 | A | A | A | A | A |
| Example 2 | A | A | B | B | A |
| Example 3 | A | A | A | A | B |
| Example 4 | B | A | B | A | B |
| Example 5 | A | B | A | A | A |
| Example 6 | A | A | A | A | A |
| Example 7 | A | B | A | A | B |
| Com. Ex. 1 | D | A | D | C | — |
| Com. Ex. 2 | A | D | A | A | C |

As is clear from Table 1, the Examples using the ink set according to the invention exhibit excellent results in every evaluation category. According to the ink set and the image formation method according to the invention, it is possible to increase the image formation speed and secure jetting reliability over a long term. Additionally, it is possible to form an image having favorable abrasion resistance and offset resistance, as well as excellent halftone glossiness.

According to the aqueous ink containing an aqueous dispersion used for inkjet recording described in Japanese Patent No. 3790537, sufficient abrasion resistance of the printed material was not achieved. Further, due to the occurrence of image irregularity during performing printing at high speed, it was difficult to apply this aqueous ink to an inkjet recording method in which printing was performed at a higher speed.

On the other hand, according to the inkjet recording method described in Japanese Patent No. 3206797, it was difficult to secure the long-tem jetting reliability. Moreover, there were problems in that when a heating treatment was performed after the printing using hot air, glossiness of the image was not sufficient; and that when a fixation treatment was performed using a heat roller, offset (a phenomenon in which the image is transferred to the roller to cause smudges on the roller or image defects) was easily caused.

In view of the aforementioned, the invention has been made in order to solve the following problems.

That is, according to the invention, it is possible to provide an ink set and an image formation method that are capable of securing long-term jetting reliability, forming a high-quality image having excellent image glossiness, abrasion resistance and offset resistance, and increasing the speed of image formation.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink set comprising an ink composition and a maintenance liquid that removes from a head nozzle surface a substance that is derived from the ink composition and that adheres to the head nozzle surface,
the ink composition comprising a pigment coated with a water-insoluble polymer formed by copolymerizing a monomer mixture comprising a styrene macromer; polymer particles; a water-soluble organic solvent; and water; and
the maintenance liquid comprising an organic solvent, wherein 50% by mass or more of the organic solvent in the maintenance liquid is a polyalkyleneoxyalkylether.

2. The ink set according to claim 1, further comprising a reaction liquid capable of forming a coagulation upon contact with the ink composition.

3. The ink set according to claim 1, wherein a glass transition temperature of the polymer particles is 80° C. or higher.

4. The ink set according to claim 1, wherein a content of the polymer particles is greater than a content of the pigment.

5. The ink set according to claim 1, wherein the polymer particles are self-dispersible polymer particles.

6. The ink set according to claim 1, wherein at least 50% by mass of the organic solvent in the maintenance liquid is a solvent having an SP value of 27.5 or less.

7. The ink set according to claim 1, wherein at least 50% by mass of the water-soluble organic solvent is a solvent having an SP value of 27.5 or less.

8. An image formation method that uses the ink set according to claim 1, the method comprising an ink application process in which the ink composition is applied to a recording medium, and a maintenance process in which the substance that is derived from the ink composition and that adheres to the head nozzle surface is removed from the head nozzle surface using the maintenance liquid.

9. The image formation method according to claim 8, further comprising a reaction liquid application process in which a reaction liquid is applied to the recording medium.

10. The image formation method according to claim 9, further comprising a heating process in which the recording medium to which the ink composition has been applied is heated.

11. The image formation method according to claim 10, wherein a glass transition temperature of the polymer particles in the ink composition is 80° C. or higher.

12. The ink set according to claim 1, wherein the monomer mixture further comprises a silicone macromer represented by Formula (II):

$$X(Y)_q Si(R^4)_{3-r}(Z)_r \qquad \text{(Formula II)}$$

wherein in Formula (II), X represents a polymerizable unsaturated group; Y represents a divalent binding group; each $R^4$ independently represents a hydrogen atom, an alkyl group having 1 to 5 carbon atoms, an aryl group or an alkoxy group; Z represents a residue of a monovalent siloxane polymer having a number average molecular weight of 500 or more; q represents 0 or 1; and r represents an integer from 1 to 3.

13. The ink set according to claim 7, wherein at least 50% by mass of the water-soluble organic solvent is a solvent having an SP value of 24 or less.

14. The ink set according to claim 1, wherein the polyalkyleneoxyalkylether has from 1 to 4 carbon atoms at the alkylene site, and has 1 to 4 carbon atoms at the alkyl site.

* * * * *